United States Patent
van Baar et al.

(10) Patent No.: US 6,395,668 B1
(45) Date of Patent: May 28, 2002

(54) CATALYST SYSTEM FOR OLEFIN POLYMERIZATION

(75) Inventors: Jan F. van Baar, Uitgeest; Peter A. Schut, Almere; Andrew D. Horton, Amsterdam, all of (NL); Tiziano Dall'Occo, Ferrara (IT)

(73) Assignee: Basell Technology Company BV (NL)

( * ) Notice: Subject to any disclaimer, the term of this patent is extended or adjusted under 35 U.S.C. 154(b) by 0 days.

(21) Appl. No.: 09/868,078

(22) PCT Filed: Dec. 13, 1999

(86) PCT No.: PCT/EP99/09847

§ 371 (c)(1),
(2), (4) Date: Jun. 13, 2001

(87) PCT Pub. No.: WO00/35974

PCT Pub. Date: Jun. 22, 2000

(30) Foreign Application Priority Data

Dec. 15, 1998 (EP) .............................................. 98204262

(51) Int. Cl.[7] .......................... B01J 31/18; B01J 31/28; C08F 4/60
(52) U.S. Cl. ...................... 502/123; 502/155; 502/167; 502/259; 502/260; 502/261; 526/161; 526/171; 526/172; 526/156; 526/348; 556/137; 556/138
(58) Field of Search ................................. 526/161, 171, 526/172, 156, 348; 502/155, 123, 259, 167, 260, 261; 556/137, 138

(56) References Cited

U.S. PATENT DOCUMENTS 6,127,497 A * 10/2000 Matsunaga et al. ......... 526/141
6,194,341 B1 * 2/2001 Canich et al. ............... 502/113

FOREIGN PATENT DOCUMENTS

| | | | |
|---|---|---|---|
| WO | 9602580 | 2/1996 | ............ C08F/4/642 |
| WO | 9623010 | 8/1996 | ......... C08F/210/16 |
| WO | 9702298 | 1/1997 | ............ C08F/10/02 |
| WO | 9748737 | 12/1997 | .............. C08F/4/80 |
| WO | 9803559 | 1/1998 | .............. C08F/4/70 |
| WO | 9827124 | 6/1998 | ............ C08F/10/00 |
| WO | WO 98/27124 | * 6/1998 | |
| WO | 9830609 | 7/1998 | ............ C08F/10/00 |
| WO | 9830612 | 7/1998 | ............ C08F/10/06 |
| WO | 9840374 | 9/1998 | ......... C07D/319/02 |
| WO | 9842664 | 10/1998 | ......... C07D/207/00 |
| WO | 9842665 | 10/1998 | ......... C07D/207/00 |
| WO | 9921899 | 5/1999 | ............ C08F/10/02 |
| WO | 0121674 | 3/2001 | ............ C08F/10/00 |

OTHER PUBLICATIONS

L. Johnson et al., J. Am. Chem. Soc., 117: 6414–6415 (1995).
B. Small et al., J. Am. Chem. Soc., 120: 4049–4050 (1998).
K. Ziegler et al., Liebigs Ann. Chem., vol. 629: 14–19 (1959) (plus English Abstract).

* cited by examiner

*Primary Examiner*—David W. Wu
*Assistant Examiner*—R. Harlan

(57) ABSTRACT

It is disclosed a new catalyst system for the polymerization of olefins comprising the product obtainable by contacting the following components: (A) one or more compounds of a late transition metal belonging to Group 8–11 of the Periodic Table; and (B) the reaction product of water with one or more organometallic aluminum compounds of formula (IV): $Al(CH_2-CR^3R^4R^5)_xR^6_yH_z$, wherein $R^3$ is a $C_1$–$C_{20}$ alkyl, $C_3$–$C_{20}$ cycloalkyl or $C_7$–$C_{20}$ alkylaryl radical; $R^4$ is different from a straight alkyl and is a $C_3$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical; or $R^3$ and $R^4$ form together a $C_4$–$C_6$ ring; $R^5$ is hydrogen or a $C_1$–$C_{20}$ alkyl, $C_6$–$C_{20}$ aryl, $C_7$–$C_{20}$ alkylaryl or arylalkyl radical; $R^6$ is a $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical; x is 1–3; z is 0–1; and y is 3–x–z; the molar ratio between said organometallic aluminum compound and water being comprised between 0.5:1 and 100:1.

23 Claims, 4 Drawing Sheets

CATALYST SYSTEM FOR OLEFIN POLYMERIZATION

FIELD OF THE INVENTION

The present invention relates to new catalyst systems comprising the product obtained by contacting late transition metal catalyst compounds, and a specific class of alumoxanes: these catalyst systems are particularly active and stable in the homo and copolymerization of olefinic monomers.

PRIOR ART DISCLOSURE

Besides metallocene catalysts based on Groups 4 and 5 of the Periodic Table of the Elements (new IUPAC notation), the use of late transition metal complexes for olefin polymerization has been studied and developed in the last years. These complexes exhibit characteristics different from those of well-known metallocenes, constrained-geometry catalysts or traditional Ziegler-Natta catalysts, when used in olefin polymerization. L. K. Johnson et al. (*J. Am. Chem. Soc.* 117:6414–6415, 1995) describes the use of Ni and Pd complexes with bidentate diimine ligands for α-olefin polymerization; in order to exert a catalytic activity, said complexes are activated with $H^+(OEt_2)_2[B(3,5-(CF_3)_2C_6H_3)_4]^-$, methylalumoxane (MAO) or $Et_2AlCl$ as cocatalysts. These systems have the ability to produce highly branched polymers from ethylene and to copolymerize ethylene with polar monomers.

A class of late transition metal complexes of bidentate α-diimine or β-diimine ligands is disclosed in the international patent application WO 96/23010; said complexes are used in the oligomerization and polymerization of α-olefins, in particular of ethylene, and in the copolymerization of ethylene with polar monomers. The complexes are activated with halo-aluminum alkyl derivatives (such as $Et_2AlCl$, $EtAlCl_2$ and $iBu_2AlCl$), MAO and alkylboronic acid derivatives.

The international patent application WO 98/03559 describes the polymerization of α-olefins or cycloolefins by using one of the above Ni and Pd α-diimine complexes, wherein the cocatalyst is a Lewis acid selected from the group consisting of $B(C_6F_5)_3$, $AlCl_3$, $AlBr_3$, $Al(OTf)_3$ and compounds of formula $(R^aR^bR^cC)Y$, wherein $R^a$–$R^c$ are aryl or substituted aryl groups and Y is a relatively non-coordinating anion. According to this application, compounds commonly used in metallocene activation such as $AlMe_3$, $AlEt_3$, $Al(OEt)Et_2$ and $ZnEt_2$ do not exert any cocatalytic activity with diimine Ni and Pd complexes, unless at least one of the selected cocatalysts is present.

The above-mentioned α-diimine complexes of late transition metals, are also used in polymerization processes at elevated pressure and temperatures, thus obtaining polyethylene products having different molecular weights and branching degrees (see the international patent application WO 97/48737); the catalyst systems are activated with MAO. Bidentate ligands, which are useful in the preparation of Ni complexes active in the polymerization of ethylene, norbornenes and styrenes, are described in the international patent application WO 97/02298; as cocatalysts are used acids of a non coordinating monoanion of formula HX, wherein the preferred anions X were $BF_4^-$, $PF_6^-$, BAF (i.e. tetrakis[3,5-bis(trifluoromethyl)phenyl]borate) and $SbF_6^-$; all the polymerization examples have been carried out in the presence of $HBAF(Et_2O)_2$. Further Ni(II) complexes with monoanionic ligands having different structures are described in the international patent application WO 98/30609; said complexes are activated with a Lewis acid cocatalyst, such as $BPh_3$, $B(C_6F_5)_3$ or $BF_3$, or MAO to polymerize a-olefins, cyclopentene, styrene, norbornene or polar monomers.

The international patent applications WO 98/42664 and WO 98/42665 describe Group 4–10 metal chelates, and in particular Ni or Pd chelates, comprising bidentate ligand compounds of substituted pyrrolaldimine and substituted salicylaldimine. Said chelates are used in catalyst systems for olefin homopolymerization or copolymerization with functionalized α-olefin monomers.

The international patent application WO 98/40374 describes olefin polymerization catalysts containing Group 8–10 metals and bidentate ligands having the following formula:

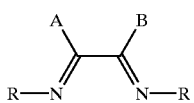

wherein R is hydrocarbyl, substituted hydrocarbyl or silyl; A and B are heteroatom connected monoradicals wherein the connected heteroatoms belong to Group 15 or 16, and A and B may be linked by a bridging group. These catalysts optionally contain a Bronsted or Lewis acid as cocatalyst; in the working examples, ethylene oligomerizations or (co) polymerizations are cocatalyzed with MAO. borate compounds, such as $HBAr_4$ (Ar=3,5-bis(trifluoromethyl) phenyl), $B(C_6F_5)_3$, and aluminum alkyls, such as $Et_2AlCl$.

Recently, Brooke L. Small et al. (*J. Am. Chem. Soc.* 120:4049–4050, 1998) disclosed Fe(II) and Co(II) catalyst systems incorporating tridentate pyridine duimine ligands having the following general structure:

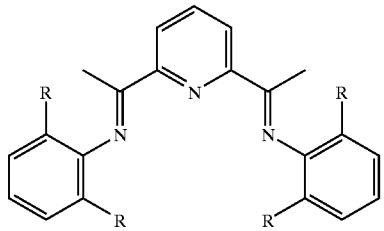

wherein R are H, methyl or iso-propyl. The active catalysts, generated by the addition of MAO, are able to convert ethylene to linear high density polyethylene; increasing the steric bulk of the ortho aryl substituents increases molecular weight.

The polymerizations of ethylene and propylene with the above-mentioned complexes of pyridine bis-imine, and more specifically of 2,6-pyridinecarboxaldehyde bis(imines) and 2,6-diacylpyridine bis(imines), are described in the international patent applications WO 98/27124 and WO 98/30612 respectively, wherein the above catalysts are activated by means of the following cocatalysts: methylalumoxane (MAO), boron compounds (such as $B(C_6F_5)_3$) and aluminum alkyl compounds (such as $Et_2AlCl$ and $EtAlCl_2$).

Although the above-described late transition metal catalyst systems are very active in the polymerization of ethylene and may lead to final polymers with interesting structural properties, due to the branching degree, their use is not completely satisfactory, because of the considerable decay of the catalyst activity. In fact, although polymerization activities of these catalysts is quite high in the initial phase of the polymerization, they rapidly decay in the course of the reaction and the deactivation is almost quantitative after few hours. The deactivation mechanism is not known so far. Therefore, these catalysts are not altogether satisfactory if the residence times of the reaction mixture in the reactor are long. This is particularly important in industrial polymerization processes, where it is not possible to operate with short residence times.

As will be demonstrated by the same Applicant in the following, a considerable polymerization activity decay of these catalyst systems occurs in the presence of the cocatalysts tested in the prior art documents described above.

Therefore, it is felt the need of lowering the decay rate and therefore improving the long-term catalytic activity of the above mentioned polymerization catalysts, in order to allow their industrial exploitation.

SUMMARY OF THE INVENTION

The Applicant has now unexpectedly found a suitable class of cocatalysts able to activate late transition metal compounds comprising a complex of a metal of group 8, 9, 10 or 11 of the Periodic Table of the Elements (new IUPAC notation) with a bidentate or tridentate ligand; according to the present invention, the catalytic activity in olefin polymerization of the transition metal compounds reported herein can be surprisingly stabilized and therefore enhanced in the long term by adding to these catalysts a specific class of alumoxanes of branched alkylaluminum compounds.

More precisely, the present invention concerns a catalyst system for the polymerization of olefins comprising the product obtainable by contacting the following components:

(A) one or more late transition metal compounds having formula (I) or (II):

(I)

(II)

wherein M is a metal belonging to Group 8, 9, 10 or 11 of the Periodic Table of the Elements (new IUPAC notation);

L is a bidentate or tridentate ligand of formula (III):

(III)

wherein:

B is a $C_1$–$C_{50}$ bridging group linking $E^1$ and $E^2$, optionally containing one or more atoms belonging to Groups 13–17 of the Periodic Table;

$E^1$ and $E^2$, the same or different from each other, are elements belonging to Group 15 or 16 of the Periodic Table and are bonded to said metal M;

the substituents $R^1$, the same or different from each other, are selected from the group consisting of hydrogen, linear or branched, saturated or unsaturated $C_1$–$C_{20}$ alkyl, $C_1$–$C_{20}$ alkyliden, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table of the Elements (such as B, Al, Si, Ge, N, P, O, S, F and Cl atoms); or two adjacent $R^1$ substituents form a saturated, unsaturated or aromatic $C_4$–$C_8$ ring, having from 4 to 20 carbon atoms;

m and n are independently 0, 1 or 2, depending on the valence of $E^1$ and $E^2$, so to satisfy the valence number of $E^1$ and $E^2$; q is the charge of the bidentate or tridentate ligand so that the oxidation state of $MX_pX'_s$ or MA is satisfied, and the compound (I) or (II) is overall neutral;

the substituents X, the same or different from each other, are monoanionic sigma ligands selected from the group consisting of hydrogen, halogen, —R, —OR, —OSO$_2$CF$_3$, —OCOR, —SR, —NR$_2$ and —PR$_2$ groups, wherein the R substituents are linear or branched, saturated or unsaturated, $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radicals, optionally containing one or more atoms belonging to groups 13–17 of the Periodic Table of the Elements (new IUPAC notation), such as B, N, P, Al, Si, Ge, O, S and F atoms; or two X groups form a metallacycle ring containing from 3 to 20 carbon atoms; the substituents X are preferably the same;

X' is a coordinating ligand selected from mono-olefins and neutral Lewis bases wherein the coordinating atom is N, P, O or S;

p is an integer ranging from 0 to 3, so that the final compound (I) or (II) is overall neutral;

s ranges from 0 to 3; A is a π-allyl or a π-benzyl group; and (B) the reaction product of water with one or more organometallic aluminum compounds of formula (IV):

(IV)

wherein, in any (CH$_2$—CR$^3$R$^4$R$^5$) groups, the same or different from each other, R$^3$ is a linear or branched, saturated or unsaturated $C_1$–$C_{20}$ alkyl, $C_3$–$C_{20}$ cycloalkyl or $C_7$–$C_{20}$ alkylaryl radical, optionally containing one or more Si or Ge atoms; R$^4$ is a saturated or unsaturated $C_3$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical, optionally containing one or more Si or Ge atoms, said radical being different from a straight alkyl or alkenyl group; or R$^3$ and R$^4$ form together a $C_4$–$C_6$ ring; R$^5$ is hydrogen or a linear or branched, saturated or unsaturated $C_1$–$C_{20}$ alkyl, $C_6$–$C_{20}$ aryl, $C_7$–$C_{20}$ alkylaryl or arylalkyl radical, optionally containing one or more Si or Ge atoms;

R$^6$ is a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical;

x is an integer ranging from 1 to 3; z is 0 or 1; and y is 3-x-z. the molar ratio between said organometallic aluminum compound and water being comprised between 0.5:1 and 100:1.

The present invention further provides a process for the (co)polymerization of olefins comprising the reaction of polymerization of one or more olefinic monomers in the presence of a catalyst system as reported above.

DETAILED DESCRIPTION OF THE INVENTION

The catalyst systems for olefin polymerization and the process using them, according to the present invention, will be better described in the following detailed description.

Figure 1:
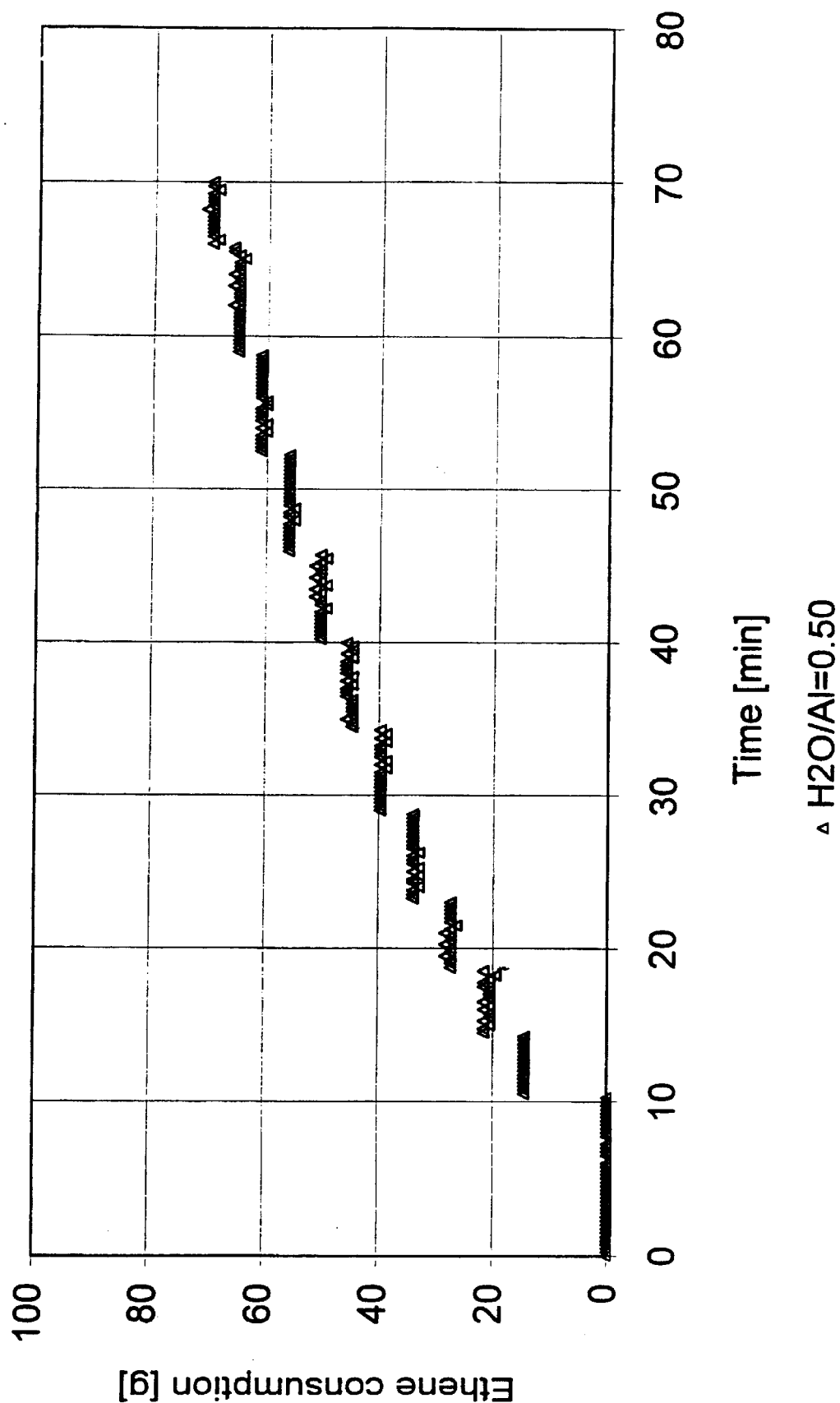
FIGS. 1 and 2 show graphs wherein is plotted the polymerization activity of catalyst systems according to the present invention vs. polymerization time.

In the late transition metal compound of component (A), having formula (I) or (II):

$$LMX_pX'_s \qquad (I)$$

$$LMA \qquad (II)$$

the metal M is preferably selected from the group consisting of Fe, Co, Ni, Pd and Pt. L is a bidentate or tridentate ligand corresponding to formula (III):

$$\left[ R^1_m - E^1 \overset{B}{\diagdown} E^2 - R^1_n \right]^q \qquad (III)$$

wherein B, $E^1$, $E^2$, $R^1$, m, n and q have the meaning reported above.

According to a preferred embodiment of the present invention, the bridging group B corresponds to a structural formula selected from the group consisting of:

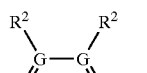
B-1

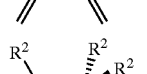
B-2

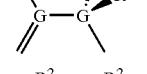
B-3

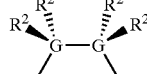
B-4

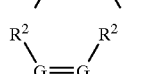
B-5

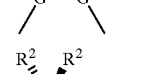
B-6

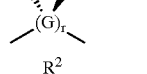
B-7

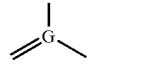
B-8

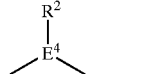
B-9

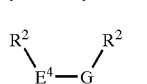
B-10

-continued

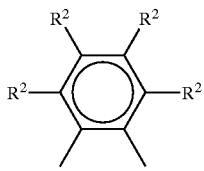
B-11

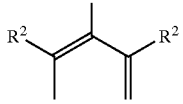
B-12

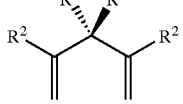
B-13

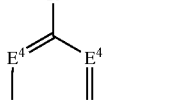
B-14

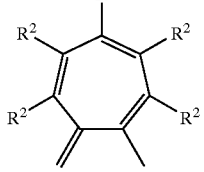
B-15

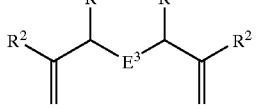
B-16

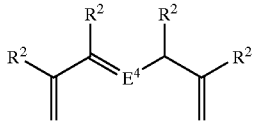
B-17

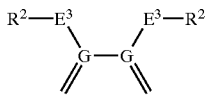
B-18

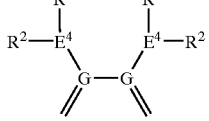
B-19

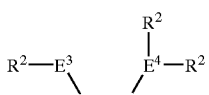
B-20

B-21

-continued

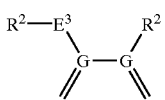
B-22

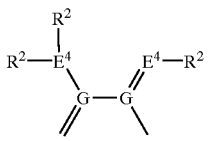
B-23

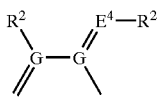
B-24

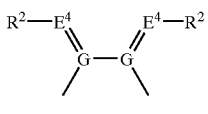
B-25

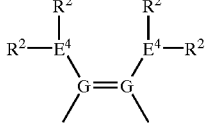
B-26

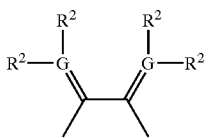
B-27

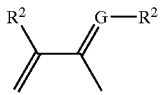
B-28 wherein G is an element belonging to Group 14 of the Periodic Table, and is preferably C, Si or Ge; r is an integer ranging from 1 to 5; $E^3$ is an element belonging to Group 16 and $E^4$ belongs to Group 13 or 15 of the Periodic Table;

the substituents $R^2$, the same or different from each other, are selected from the group consisting of hydrogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table (such as B, Al, Si, Ge, N, P, O, S, F and Cl atoms); or two $R^2$ substituents form a saturated, unsaturated or aromatic $C_4$–$C_8$ ring, having from 4 to 20 carbon atoms, or they form a polycyclic ring system, optionally containing one or more Group 13–16 elements; a substituent $R^1$ and a substituent $R^2$ may form a substituted or unsubstituted, saturated, unsaturated or aromatic $C_4$–$C_8$ ring, having from 4 to 20 carbon atoms and optionally containing one or more Group 13–16 element. In the bidentate or tridentate ligand L of formula (III), $E^1$ and $E^2$ belong to Group 15 or 16 of the Periodic Table, and preferably are selected from the group consisting of N, P, O, and S. In the late transition metal compounds of formula (I) or (II), the substituents $R^1$, the same or different from each other, are preferably bulky groups; more preferably, they are $C_6$–$C_{20}$ aryl groups, and even more preferably are substituted in the 2 and 6 positions with a $C_1$–$C_{10}$ alkyl group.

The substituents X are preferably hydrogen, methyl, phenyl, Cl, Br or I; p is preferably 1, 2 or 3.

When X' is a neutral Lewis base wherein the coordinating atom is N, P, O or S, it is preferably selected from the group consisting of phosphines, amine, pyridines, nitriles and sulfides; even more preferably, it is selected from the group consisting of triphenylphosphine, tri($C_1$–$C_6$ alkyl) phosphines, tricycloalkyl phosphines, diphenyl alkyl phosphines, dialkyl phenyl phosphines, triphenoxyphosphine, trimethylphosphine, pyridine, substituted pyridines, di($C_1$–$C_3$ alkyl) ether and tetrahydrofuran.

When X' is a mono-olefin, it is a hydrocarbyl group having one carbon-carbon double bond, having from 2 to 20 carbon atoms; preferably is a substituted or unsubstituted $C_2$–$C_6$ alkene. The variable s is preferably 0 or 1.

A is a π-allyl or a π-benzyl group. By a π-allyl group is meant a monoanionic ligand with 3 adjacent $sp^2$ carbon atoms bound to a metal center in an $\eta^3$ fashion. The three $sp^2$ carbon atoms may be substituted with other hydrocarbyl groups or functional groups; preferred π-allyl radicals are $CH_2CHCH_2$, $CH_2CHCHMe$ and $CH_2CHCMe_2$.

By a π-benzyl group is meant a π-allyl ligand in which two of the $sp^2$ carbon atoms are part of an aromatic ring; preferred benzyl radicals are $CH_2Ph$ and $CH_2C_6F_5$.

Examples of other suitable π-allyl and π-benzyl groups can be found in the international patent application WO 98/30609.

According to a preferred embodiment of the invention, the ligand of formula (III) is bidentate: the bridging group B corresponds to structural formula B-1, wherein G is C, $E^1$ and $E^2$ are N, m and n are 1 and q is 0; said neutral bidentate ligand has formula (V):

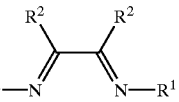

(V)

wherein $R^1$ and $R^2$ have the meaning reported above.

In formula (V), the substituents $R^2$ are preferably the same and are selected from the group consisting of hydrogen, methyl, ethyl, n-propyl, i-propyl and benzyl, or the two substituents $R^2$ form together a mono or polycyclic ring system.

According to a particularly preferred embodiment of the invention, in formula (V) the two substituents $R^2$ form a acenaphtenquinone group, thus resulting the following ligand:

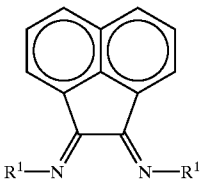

wherein $R^1$ has the meaning reported above.

In formula (V), the substituents $R^1$ are preferably $C_6$–$C_{20}$ aryl groups, optionally substituted in the 2 and 6 positions with a $C_1$–$C_{10}$ alkyl group; according to preferred embodiments of the invention, $R^1$ is selected from the group consisting of phenyl, 2,6-dimethyl-phenyl, 2,6-diisopropyl-phenyl and 2,4,6-trimethyl-phenyl.

When the catalyst systems of the invention are used in the production of high molecular polymers, said 2 and 6 positions are preferably substituted with a branched $C_3$–$C_{20}$ alkyl groups, preferably having a secondary or tertiary carbon atom bonded to the phenyl group.

When the catalyst systems of the invention are used in the production of low molecular polymers, said 2 and 6 positions are preferably substituted with a linear or branched $C_1$–$C_{10}$ alkyl group with a primary carbon atom bonded to the phenyl group.

For macromer preparation, no substituents are present in said 2 and 6 positions of the phenyl group.

When the ligand L corresponds to formula (V), M preferably belongs to Group 10 of the Periodic Table, and even more preferably it is Ni or Pd; if the transition metal compound has formula (I), X radicals are preferably hydrogen, methyl, Cl, Br or I; p is preferably 2 or 3; s is preferably 0.

The ligands of formula (V) and the corresponding complexes with late transition metals can be prepared according to methods known in the state of the art, for instance as described in the international patent application WO 96/23010.

Preferred late transition metal compounds of formula (I), wherein the bidentate ligand L corresponds to formula (V), are reported in the following for illustrative purposes:

[(2,6-iPr$_2$Ph)—N=C(H)—C(H)=N—(2,6-iPr$_2$Ph)]NiBr$_2$
[(2,6-iPr$_2$Ph)—N=C(Me)—C(Me)=N—(2,6-iPr$_2$Ph)] NiBr$_2$
[(2,6-iPr$_2$Ph)—N=C(An)—C(An)=N—(2,6-iPr$_2$Ph)] NiBr$_2$
[(2,6-Me$_2$Ph)—N=C(H)—C(H)=N—(2,6-Me$_2$Ph)]NiBr$_2$
[(2,6-Me$_2$Ph)—N=C(Me)—C(Me)=N—(2,6-Me$_2$Ph)] NiBr$_2$
[(2,6-Me$_2$Ph)—N=C(An)—C(An)=N—(2,6-Me$_2$Ph)] NiBr$_2$
[(2,4,6-Me$_3$Ph)—N=C(H)—C(H)=N—(2,4,6-Me$_3$Ph)] NiBr$_2$
[(2,4,6-Me$_3$Ph)—N=C(Me)—C(Me)=N—(2,4,6-Me$_3$Ph)] NiBr$_2$
[(2,4,6-Me$_3$Ph)—N=C(An)—C(An)=N—(2,4,6-Me$_3$Ph)] NiBr$_2$ or the corresponding dichloride, dimethyl, monochloride or monomethyl complexes, wherein An=acenaphtenquinone, Me=methyl, iPr=iso-propyl and Ph=phenyl.

According to another preferred embodiment of the invention, the ligand of formula (III) is tridentate. B corresponds to the structure B-17 wherein the $E^4$ is N, $E^1$ and $E^2$ are N, m and n are 1, and q is 0; said neutral tridentate ligand has formula (VI):

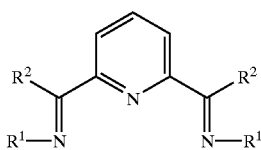

(VI)

wherein the $R^1$ and $R^2$ groups, the same or different from each other, have the meaning reported above.

According to a particularly preferred embodiment of the invention, in the tridentate ligand of formula (VI), the substituents $R^2$ are hydrogen or methyl, and the substituents $R^1$ are aryl rings.

When the catalyst systems of the invention are used in the production of high molecular polymers, the substituents $R^1$ are aryl rings substituted in the 2 and 6 positions with branched $C_3$–$C_{20}$ alkyl groups, having a secondary or tertiary carbon atom bonded to the phenyl group.

When the catalyst systems of the invention are used in the production of low molecular polymers, the substituents $R^1$ are aryl rings substituted in the 2 and 6 positions with linear or branched $C_1$–$C_{10}$ alkyl groups, having a primary carbon atom bonded to the phenyl group.

When the tridentate ligand corresponds to formula (VI), the metal M preferably belongs to Group 8 or 9 of the Periodic Table, and even more preferably it is Fe, Ru, Co or Rh; if the transition metal compound has formula (I), the X radicals, the same or different from each other, are preferably hydrogen, methyl, Cl Br or I; p is preferably 2 or 3; s is preferably 0.

The ligands of formula (VI) and the corresponding complexes with late transition metals can be prepared according to methods known in the state of the art, for instance as described in the international patent applications WO 98/27124 and WO 98/30612.

Preferred late transition metal compounds of formula (I), wherein the ligand L corresponds to formula (VI), are reported in the following for illustrative purposes:

{2,6-[(2,6-iPr$_2$Ph)—N=C(Me)]pyridyl}FeBr$_2$
{2,6-[(2,6-Me$_2$Ph)—N=C(Me)]pyridyl}FeBr$_2$
{2,6-[(2,4,6-Me$_3$Ph)—N=C(Me)]pyridyl}FeBr$_2$
{2,6-[(2,6-iPr$_2$Ph)—N=C(Me)]pyridyl}CoBr$_2$
{2,6-[(2,6-Me$_2$Ph)—N=C(Me)]pyridyl}CoBr$_2$
{2,6-[(2,4,6-Me$_3$Ph)—N=C(Me)]pyridyl}CoBr$_2$
{2,6-[(2,6-iPr$_2$Ph)—N=C(Me)]pyridyl}FeBr$_3$
{2,6-[(2,6-Me$_2$Ph)—N=C(Me)]pyridyl}FeBr$_3$
{2,6-[(2,4,6-Me$_3$Ph)—N=C(Me)]pyridyl}FeBr$_3$
{2,6-[(2,6-iPr$_2$Ph)—N=C(Me)]pyridyl}CoBr$_3$
{2,6-[(2,6-Me$_2$Ph)—N=C(Me)]pyridyl}CoBr$_3$
{2,6-[(2,4,6-Me$_3$Ph)—N=C(Me)]pyridyl}CoBr$_3$ or the corresponding chloride complexes (LFeCl$_2$, LCoCl$_2$, LFeCl$_3$ or LCoCl$_3$, L being one of the ligands reported above) or methyl complexes, wherein Me=methyl, iPr=iso-propyl and Ph=phenyl.

According to another embodiment of the invention, the ligand of formula (III) is bidentate: the bridging group B corresponds to the structural formula B-3, wherein G is C, $E^1$ and $E^2$ are N, m and n are 2 and q is 0; said neutral bidentate ligand has formula (VII):

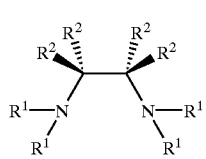

(VII)

wherein $R^1$ and $R^2$ have the meaning reported above.

At least one substituent $R^1$ linked to each N atom is preferably an aryl ring, more preferably substituted in the 2 and 6 positions; according to preferred embodiments of the invention, at least one $R^1$ linked to each N atom is selected from the group consisting of phenyl, 2,6-dimethyl-phenyl, 2,6-diisopropyl-phenyl and 2,4,6-trimethyl-phenyl. The remaining $R^1$ ligand linked to N is preferably hydrogen, methyl or ethyl.

The substituents $R^2$ are preferably the same and are selected from the group consisting of hydrogen, methyl and phenyl, or two substituents $R^2$ form together a mono or polycyclic ring system, optionally containing one or more Group 13–16 elements.

When the bidentate ligand corresponds to formula (VII), M is preferably of Group 10, and even more preferably is Ni or Pd; if the transition metal compound has formula (I), X radicals are preferably hydrogen, methyl, Cl, Br or I; p is preferably 2 or 3; s is preferably 0.

The ligands of formula (VII) and the corresponding complexes with late transition metals can be prepared according to methods known in the state of the art, for instance as described in the international patent application WO 97/02298.

According to another embodiment of the invention, the ligand of formula (III) is bidentate: the bridging group B corresponds to structural formula B-18, B-19 or B-20, wherein G is C, $E^1$ and $E^2$ are N, m and n are 1 and q is 0; said neutral bidentate ligands have formulae (VIII)–(XI):

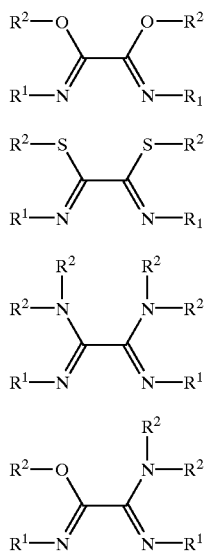

(VIII)
(IX)
(X)
(XI)

wherein $R^1$ and $R^2$ have the meaning reported above.

The substituent $R^1$ are preferably aryl groups, more preferably substituted in the 2 and 6 positions; according to preferred embodiments of the invention, $R^1$ is selected from the group consisting of phenyl, 2,6-dimethyl-phenyl, 2,6-diisopropyl-phenyl and 2,4,6-timenthyl-phenyl.

The substituents $R^2$ are preferably the same and are selected from the group consisting of hydrogen, methyl and phenyl, or two substituents $R^2$ form together a mono or polycyclic ring system, optionally containing one or more Group 13–16 elements; or a substituent $R^1$ and a substituent $R^2$ form together a mono or polycyclic ring system, optionally containing one or more Group 13–16 elements.

When the bidentate ligand corresponds to one of formulae (VIII)–(XI), M is preferably of Group 10, and even more preferably is Ni(II) or Pd(II); if the transition metal compound has formula (I), X radicals are preferably hydrogen, methyl, Cl, Br or I; p is preferably 2 or 3; s is preferably 0.

The ligands of formulae (VIII)–(XI) and the corresponding complexes with late transition metals can be prepared according to methods known in the state of the art, for instance as described in the international patent application WO 98/40374.

According to another preferred embodiment of the invention, the ligand of formula (III) is bidentate, B corresponds to the structure B-28 wherein G is C, $E^1$ and $E^2$ are N, a substituent $R^1$ and a substituent $R^2$ form a substituted ring, m and n are 1, and q is –1; said anionic bidentate ligand has formula (XII):

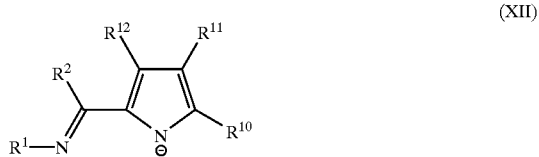

(XII)

wherein $R^1$ and $R^2$ have the meaning reported above and $R^{10}$–$R^{12}$, the same or different from each other, are selected from the group consisting of hydrogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table of the Elements (such as B, Al, Si, Ge, N, P, O, S, F and Cl atoms); or two adjacent substituents $R^{10}$–$R^{12}$ form a saturated, unsaturated or aromatic $C_4$–$C_8$ ring, having from 4 to 40 carbon atoms.

According to a particularly preferred embodiment of the invention, in the bidentate ligand of formula (XII), the substituent $R^2$ is hydrogen or methyl; the substituents $R^1$ and $R^{10}$ are steric bulky groups, preferably aryl rings (more preferably substituted in the 2 and 6 positions with branched $C_3$–$C_{30}$ alkyl groups) or tertiary $C_3$–$C_6$ alkyl groups; the substituents $R^{11}$ and $R^{12}$ are preferably hydrogen or methyl.

When the catalyst systems of the invention are used in the production of high molecular and linear polymers, having low degrees of branching, $R^1$ and $R^{10}$ are aryl rings substituted in the 2 and 6 positions with a branched $C_3$–$C_{10}$ alkyl groups, having a secondary or tertiary carbon atom bonded to the phenyl group.

When the catalyst systems of the invention are used in the production of low molecular polymers or oligomers, $R^1$ and $R^{10}$ are aryl rings substituted in the 2 and 6 positions with a linear or branched $C_1$–$C_{10}$ alkyl group, having a primary carbon atom bonded to the phenyl group.

When the bidentate ligand corresponds to formula (XII), the metal M is preferably Fe, Co, Rh, Ni or Pd; if the transition metal compound has formula (I), X radicals, the same or different from each other, are preferably hydrogen, methyl, Cl Br or I; p is preferably 2 or 3; s is preferably 0.

The ligands of formula (XII) and the corresponding complexes with late transition metals can be prepared according to methods known in the state of the art, for instance as described in the international patent application WO 98/42665.

Preferred late transition metal compounds of formula (I), wherein the ligand L corresponds to formula (XII), are reported in the following for illustrative purposes:

[$C_4H_3N$—C(H)═N—(2,6-$iPr_2$Ph)]NiBr$_2$
[$C_4H_3N$—C(Me)═N—(2,6-$iPr_2$Ph)]NiBr$_2$
[$C_4H_3N$—C(H)═N—(2,6-$Me_2$Ph)]NiBr$_2$
[$C_4H_3N$—C(Me)═N—(2,4,6-$Me_3$Ph)]NiBr$_2$ or the corresponding dichloride, dimethyl, monochloride or monomethyl complexes, wherein Me=methyl, iPr=isopropyl and Ph=phenyl.

According to another preferred embodiment of the invention, the ligand of formula (III) is bidentate, B corresponds to the structure B-12 wherein two vicinal substituent $R^2$ form an aromatic ring, $E^1$ and $E^2$ are N, m and n are 1, and q is –1; said anionic bidentate ligand has formula (XIII):

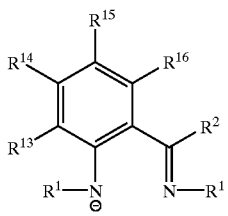

(XIII)

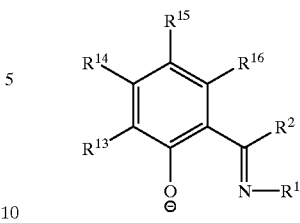

(XIV)

wherein $R^1$ and $R^2$ have the meaning reported above; the substituents $R^{14}$ and $R^{16}$, the same or different from each other, are selected from the group consisting of hydrogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table of the Elements (such as B, Al, Si, Ge, N, P, O, S, F and Cl atoms);

the substituents $R^1$ and $R^{15}$, the same or different from each other, have the same meaning of substituents $R^{14}$ and $R^{16}$, optionally forming with an adjacent substituent $R^{14}$ or $R^{16}$ a saturated, unsaturated or aromatic $C_4$–$C_8$ ring, or they are electron withdrawing groups.

According to a particularly preferred embodiment of the invention, in the bidentate ligand of formula (XIII), the substituents $R^1$ are steric bulky groups, preferably aryl rings (more preferably substituted in the 2 and 6 positions with branched $C_3$–$C_{30}$ alkyl groups) or tertiary $C_3$–$C_6$ alkyl groups; the substituent $R^2$ is hydrogen or methyl; the substituents $R^{14}$ and $R^{16}$ are hydrogen or methyl; the substituent $R^{13}$ is a steric bulky groups, preferably an aryl ring (more preferably substituted in the 2 and 6 positions with branched $C_3$–$C_{30}$ alkyl groups) or a tertiary $C_3$–$C_6$ alkyl group, or —$NO_2$, Cl or Br; and $R^{15}$ is an electron withdrawing group selected from —$NO_2$, Cl, Br, I, —$CF_3$, —$SO_3^-$, —$SO_2R$ and —$COO^-$.

When the catalyst systems of the invention are used in the production of high molecular polymers, the substituents $R^1$ are preferably aryl groups substituted in the 2 and 6 positions with a branched $C_3$–$C_{30}$ alkyl groups, preferably having a secondary or tertiary carbon atom bonded to the phenyl group.

When the bidentate ligand corresponds to formula (XIII), the metal M is preferably Fe, Co, Ni or Pd; if the transition metal compound has formula (I), X radicals, the same or different from each other, are preferably hydrogen, methyl, Cl Br or I; p is preferably 2 or 3; s is preferably 0.

The ligands of formula (XIII) and the corresponding complexes with late transition metals can be prepared according to methods known in the state of the art, for instance as described in the international patent application WO 98/42664.

According to another preferred embodiment of the invention, the ligand of formula (III) is bidentate, the bridging group B corresponds to the structural formula B-12, wherein two vicinal substituent $R^2$ form an aromatic ring, $E^1$ is O and $E^2$ is N, m=0, n=1, and q is −1; said anionic bidentate ligand has formula (XIV):

wherein $R^1$, $R^2$ and $R^{13}$–$R^{16}$ have the meaning reported above in connection with formula (XIII).

When the catalyst systems of the invention are used in the production of high molecular polymers, $R^1$ is preferably an aryl group substituted in the 2 and 6 positions with a branched $C_3$–$C_{20}$ alkyl group, preferably having a secondary or tertiary carbon atom bonded to the phenyl group.

When the bidentate ligand corresponds to formula (XIV), the metal M preferably belongs to Group 10 of the Periodic Table, and even more preferably is Ni; if the transition metal compound has formula (I), X radicals, the same or different from each other, are preferably hydrogen, methyl, allyl, Cl, Br or I, p is preferably 1 and s is preferably 1; if the transition metal compound has formula (II), A is preferably selected from the group consisting of $CH_2CHCH_2$, $CH_2CHCHMe$, $CH_2CHCMe_2$, $CH_2Ph$ and $CH_2C_6F_5$ radicals.

Preferred late transition metal compounds of formula (I), wherein the ligand L corresponds to formula (XIV), are reported in the following for illustrative purposes:

[{2-O-3-Ph—$C_6H_3$}—CH=N—(2,6-i$Pr_2$—$C_6H_3$)]NiPh (PPh$_3$)

[{2-O-3-(9-anthracenyl)$C_6H_3$}—CH=N—(2,6-i$Pr_2$—$C_6H_3$)]NiPh(PPh$_3$)

[{2-O-3,5-t$Bu_2$—$C_6H_2$}—CH=N—(2,6-i$Pr_2$—$C_6H_3$)]NiPh(PPh$_3$)

[{2-O-3,5-($NO_2$)$_2$—$C_6H_2$}—CH=N—(2,6-i$Pr_2$—$C_6H_3$)]NiPh(PPh$_3$)

[{2-O-3-Ph—$C_6H_3$}—CH=N—(2,6-i$Pr_2$—$C_6H_3$)]Ni($C_3H_5$)

[{2-O-3-(9-anthracenyl)$C_6H_3$}—CH=N—(2,6-i$Pr_2$—$C_6H_3$)]Ni($C_3H_5$)

[{2-O-3,5-t$Bu_2$—$C_6H_2$}—CH=N—(2,6-i$Pr_2$—$C_6H_3$)]Ni($C_3H_5$)

[{2-O-3,5-($NO_2$)$_2$—$C_6H_2$}—CH=N—(2,6-i$Pr_2$—$C_6H_3$)]Ni($C_3H_5$)

[{2-O-3-Ph—$C_6H_3$}—CH=N—(2,6-$Me_2$—$C_6H_3$)]NiPh(PPh$_3$)

[{2-O-3-(9-anthracenyl)$C_6H_3$}—CH=N—(2,6-$Me_2$—$C_6H_3$)]NiPh(PPh$_3$)

[{2-O-3,5-t$Bu_2$—$C_6H_2$}—CH=N—(2,6-$Me_2$—$C_6H_3$)]NiPh(PPh$_3$)

[{2-O-3,5-($NO_2$)$_2$—$C_6H_2$}—CH=N—(2,6-$Me_2$—$C_6H_3$)]NiPh(PPh$_3$)

[{2-O-3-Ph—$C_6H_3$}—CH=N—(2,6-$Me_2C_6H_3$)]Ni($C_3H_5$)

[{2-O-3-(9-anthracenyl)$C_6H_3$}—CH=N—(2,6-$Me_2$—$C_6H_3$)]Ni($C_3H_5$)

[{2-O-3,5-t$Bu_2$—$C_6H_2$}—CH=N—(2,6-$Me_2$—$C_6H_3$)]Ni($C_3H_5$)

[{2-O-3,5-($NO_2$)$_2$—$C_6H_2$}—CH=N—(2,6-$Me_2$—$C_6H_3$)]Ni($C_3H_5$)

wherein Me=methyl, iPr=iso-propyl, tBu=ter-butyl and Ph=phenyl.

The ligands of formula (XIV) and the corresponding complexes with late transition metals can be prepared according to methods known in the state of the art, for instance as described in the international patent application WO 98/30609 and WO 98/42664.

Component (B) of the catalyst systems according to the present invention is the reaction product of water with one or more organometallic aluminum compounds of formula (IV):

$$Al(CH_2-CR^3R^4R^5)_xR^6_yH_z \qquad (IV)$$

wherein $R^3$, $R^4$, $R^5$, $R^6$, x, y and z have the meaning reported above. The molar ratio between said organometallic aluminum compound and water ranges from 0.5:1 to 100:1, and preferably from 0.8:1 to 50:1. A particularly advantageous value of said molar ratio is about 1:1.

According to the invention, component (B) can be used in combination with organometallic aluminum compounds other than those of formula (IV), or in mixture with other compatible cocatalysts known in the state of the art.

The substituent $R^3$ is preferably a $C_1-C_5$ alkyl group, more preferably a $C_1-C_3$ alkyl group, and even more preferably methyl or ethyl; $R^4$ is preferably a saturated or unsaturated branched-chain $C_3-C_{20}$ alkyl or alkylaryl group, and more preferably a $C_4-C_{10}$ alkyl or alkylaryl group, or it is an optionally substituted phenyl group; $R^5$ is preferably hydrogen or a $C_1-C_5$ alkyl group; $R^6$ is preferably a $C_1-C_5$ alkyl group, and more preferably an isobutyl group.

The above organometallic aluminum compounds can be suitably prepared according to the methods known in the state of the art, and preferably as described in the international patent application WO 96/02580.

A subclass of organometallic aluminum compounds particularly advantageous in the catalyst systems according to the present invention comprises the compounds of formula (IV) wherein the ($CH_2$—$CR^3R^4R^5$) groups, the same or different from each other, are β,δ-branched groups; said organometallic aluminum compounds correspond to formula (XV):

$$Al(CH_2-CR^3R^5-CH_2-CR^7R^8R^9)_xR^6_yH_z \qquad (XV)$$

wherein $R^4$, $R^5$, $R^6$, x, y and z have the meaning reported above;

$R^7$ and $R^8$, the same or different from each other, are linear or branched, saturated or unsaturated $C_1-C_{20}$ alkyl, $C_3-C_{20}$ cycloalkyl, $C_6-C_{20}$ aryl, $C_7-C_{20}$ arylalkyl or alkylaryl groups; the substituents $R^3$ and $R^7$ and/or $R^7$ and $R^8$ optionally form one or two rings, having 3 to 6 carbon atoms; $R^9$ is hydrogen or has the same meaning of $R^7$ and $R^8$.

Non limiting examples of these compounds are tris(2,4,4-trimethylpentyl)aluminum (TIOA), bis(2,4,4-trimethylpentyl)aluminum hydride, isobutyl-bis(2,4,4-trimethylpentyl)aluminum, diisobutyl-(2,4,4-trimethylpentyl)aluminum, tris(2,4-dimethylheptyl)aluminum and bis(2,4-dimethylheptyl)aluminum hydride.

Another particularly preferred subclass of organometallic aluminum compounds is constituted by the compounds of formula (IV) wherein the ($CH_2$—$CR^3R^4R^5$) groups, the same or different from each other, are β,γ-branched groups; therefore, said organometallic aluminum compounds correspond to formula (XVI):

$$Al(CH_2-CR^3R^5-CR^7R^8R^9)_xR^6_yH_z \qquad (XVI)$$

wherein $R^3$, $R^5-R^9$, x, y and z have the meaning reported above for formula (XV).

In said subclass, $R^3$ is preferably a $C_1-C_5$, more preferably a $C_1-C_3$ alkyl group; according to a preferred embodiment, said $R^3$ is methyl or ethyl, $R^5$ is preferably hydrogen, $R^7$ and $R^8$ are preferably $C_1-C_5$ and more preferably $C_1-C_3$ alkyl groups, $R^9$ is preferably hydrogen or a $C_1-C_5$ alkyl group, and more preferably a $C_1-C_3$ alkyl group.

Within this subclass, particularly preferred organometallic aluminum compounds are:

tris(2,3-dimethyl-butyl)aluminum, tris(2,3,3-trimethyl-butyl)aluminum, tris(2,3-dimethyl-pentyl)aluminum, tris(2,3-dimethyl-hexyl)aluminum, tris(2,3-dimethyl-heptyl)aluminum, tris(2-methyl-3-ethyl-pentyl) aluminum, tris(2-methyl-3-ethyl-hexyl)aluminum, tris(2-methyl-3-ethyl-heptyl)aluminum, tris(2-methyl-3-propyl-hexyl)aluminun, tris(2-ethyl-3-methyl-butyl)aluminum, tris(2-ethyl-3-methyl-pentyl)aluminum, tris(2,3-diethyl-pentyl)aluminum, tris(2-propyl-3-methyl-butyl)aluminum, tris(2-isopropyl-3-methyl-butyl)aluminum, tris(2-isobutyl-3-methyl-pentyl)aluminum, tris(2,3,3-trimethyl-pentyl)aluminum, tris(2,3,3-trimethyl-hexyl)aluminum, tris(2-ethyl-3,3-dimethyl-butyl)aluminum, tris(2-ethyl-3,3-dimethyl-pentyl) aluminum, tris(2-isopropyl-3,3-dimethyl-butyl) aluminum, tris(2-trimethylsilyl-propyl)aluminum, tris (2-methyl-3-phenyl-butyl)aluminun, tris(2-ethyl-3-phenyl-butyl)aluminum, tris(2,3-dimethyl-3-phenyl-butyl)aluminum, tris(1-menthen-9-yl)aluminum and the corresponding compounds wherein one of the hydrocarbyl groups is replaced by hydrogen, and those wherein one or two of the hydrocarbyl groups are replaced by an isobutyl group. Particularly preferred compounds are tris(2,3,3-trimethyl-butyl)aluminum and tris(2,3-dimethyl-butyl) aluminum.

The latter subclass of organoaluminum compounds can be prepared according to procedures known in the state of the art, and in particular as described in WO 99/21899 (international patent application PCT/EP98/06732).

Another particularly preferred subclass of organometallic aluminum compounds is constituted by the compounds of formula (IV) wherein the ($CH_2$—$CR^3R^4R^5$) groups, the same or different from each other, bear an aryl group in position β; therefore, said organometallic aluminum compounds correspond to formula (XVII):

$$Al[CH_2-C(Ar)R^3R^5]_xH_z \qquad (XVII)$$

wherein $R^3$, $R^5$, x and z have the meaning reported above, x is 3-z and Ar is a substituted or unsubstituted aryl group having from 6 to 20 carbon atoms.

In said subclass, $R^3$ is preferably a $C_1-C_5$ alkyl group; $R^5$ is preferably hydrogen or a $C_1-C_5$ alkyl groups; and Ar is preferably selected from the group consisting of 4-fluoro-phenyl, 4-chloro-phenyl, 4-methoxyphenyl, 4-nitrophenyl, 3-methylphenyl, 3-isopropylphenyl, 2,4-difluorophenyl, 2,4-dichlorophenyl, 2,6-difluorophenyl, 2,6-dichlorophenyl, 3,5-difluorophenyl, 3,5-dichlorophenyl, 2,4,6-trifluorophenyl, 2,4,6-trichlorophenyl, 3,4,5-trifluorophenyl, 3,4,5-trichlorophenyl, pentafluorophenyl and pentachlorophenyl.

Within this subclass, particularly preferred organometallic aluminum compounds are:

tris(2-phenyl-propyl)aluminium tris[2-(4-fluoro-phenyl)-propyl]aluminium tris[2-(4-chloro-phenyl)-propyl] aluminium, tris[2-(3-isopropyl-phenyl)propyl] aluminium tris(2-phenyl-butyl)aluminium tris(3-methyl-2-phenyl-butyl)aluminium tris(2-phenyl-pentyl)aluminium tris[2-(pentafluorophenyl)propyl] aluminium tris[2,2-diphenyl-ethyl]aluminium tris[2-phenyl-2-methyl-propyl]aluminium and the corresponding compounds wherein one of the hydrocarbyl groups is replaced by hydrogen.

Particularly preferred compounds are tris(2-phenyl-propyl)aluminium, tris[2-(4-fluoro-phenyl)propyl]aluminium and tris[2-(4-chloro-phenyl)propyl]aluminium.

This subclass of organoaluminum compounds can be prepared according to procedures known in the state of the art, and in particular as described in WO 01/21674 (corresponding to the European patent application no. 99203110.4).

The above-described organometallic aluminum compounds and water can be brought into contact in different ways. Water can be gradually added to the alkyl aluminum compound of formula (IV) in solution, in an aliphatic or aromatic inert hydrocarbon solvent such as heptane or toluene; preferably, the compound of formula (IV) is brought into contact with the wet monomer or solvent in the reactor and component (A), optionally precontacted with part of the organometallic aluminum compound, is then introduced into the reactor.

According to another embodiment, water can be reacted in combined form as hydrated salt, or it can be absorbed or adsorbed on an inert support, such as silica. According to a further embodiment, the alkyl aluminum compound (IV) can be allowed to react with boric anhydride or with boric acid.

In the organometallic aluminum compounds of formula (IV), (XV), (XVI) and (XVII), z can be 0 or 1. As it is known in the state of the art, aluminum trialkyls may contain small amounts of bisalkyl-aluminum hydride; the hydride content can slightly change during prolonged storage periods and depending on the storage temperature. Therefore, component (B) can be a mixture of the two organometallic aluminum compounds of formula (IV), (XV), (XVI) and/or (XVII) wherein z=0 and z=1, so that the molar ratio between the hydrogen atoms directly bound to aluminum and aluminum atoms (i.e. the overall z value) can be a fraction, lower than 1.

The components (A) and (B) of the catalyst system according to the present invention can be brought into contact in different manners. The catalyst system may be formed prior to its introduction into the reaction vessel, or it may be formed in situ.

The catalyst system may be formed by mixing together components (A) and (B), preferably in solution, in a suitable non-polar solvent such as toluene, benzene, chlorobenzene, an alkane or an alkene, to form a liquid catalyst system. A preferred way of forming the catalyst system of the invention comprises first mixing components (A) and a part of component (B), and subsequently adding to the obtained mixture a solution of the rest of component (B), preferably in toluene.

The molar ratio between the aluminum of component (B) and the metal M of the compound (A) preferably ranges from 50:1 to 50,000:1, more preferably from 250:1 to 5000:1, and even more preferably from 500:1 to 2,500:1.

The catalysts of the present invention can also be used on inert supports. This is achieved by depositing the components (A) and/or (B), either singly or in mixture, on inert supports such as silica, alumina, silica/alumina, titania, zirconia, magnesia; suitable inert supports are olefin polymers or prepolymers. The thus obtained supported catalyst systems can be advantageously used in gas-phase polymerization.

The catalyst systems according to the present invention can be conveniently used in polymerization processes, without the occurrence of the catalyst deactivation also at prolonged polymerization times. In fact, the Applicant has surprisingly found that the use of component (B) in the catalyst system according to the present invention inhibits the massive deactivation of the catalyst, which is usually observed with the cocatalysts used in the prior art, and above all when MAO is used as cocatalyst; the catalyst systems of the invention allow to obtain high catalytic activities also in the long term, after several hours of polymerization.

Therefore, it is another object of the present invention a process for the homo-polymerization or co-polymerization of one or more olefinic monomers, characterized by the fact the polymerization reaction is performed in the presence of a catalyst system as described above. Said olefinic monomers are selected from the group consisting of ethylene, $C_3$–$C_{20}$ α-olefins, $C_4$–$C_{20}$ gem-substituted olefins, $C_8$–$C_{20}$ aromatic substituted α-olefins, $C_4$–$C_{20}$ cyclic olefins, $C_4$–$C_{20}$ non conjugated diolefins and $C_{20}$–$C_{1000}$ vinyl and vinylidene terminated macromers.

Moreover, in view of the tolerance of the above-described late transition metal catalysts to polar monomers, unsaturated polar monomers can be additionally polymerized or copolymerized. Said preferred polar monomers include $C_4$–$C_{20}$ olefins containing functional groups such as esters, ethers, carboxylates, nitriles, amines, amides, alcohols, halide carboxylic acids and the like; even more preferably, these polar monomers are vinyl esters, halides or nitriles.

According to a preferred embodiment, the present invention concerns a process for the polymerization of one or more α-olefins of formula $CH_2$=CHR, wherein R is hydrogen or a $C_1$–$C_{20}$ alkyl, $C_5$–$C_{20}$ cycloalkyl or $C_6$–$C_{20}$ aryl radical, or the copolymerization of one or more of these α-olefins with one of the polar monomers reported above. Non limiting examples of α-olefins which are suitable to be used in the polymerization process according to the present invention are ethylene, propylene, 1-butene, 1-pentene, 1-hexene, 4-methyl-1-pentene, 4,6-dimethyl-1-heptene, 1-octene, 1-decene, 1-dodecene, 1-tetradecene, 1-hexadecene, 1-octadecene and allylcyclohexane; said α-olefin is preferably ethylene.

According to a preferred embodiment, the present invention concerns a process for ethylene polymerization, performed in the presence of a catalyst system according to the invention wherein, in the late transition metal compound (A), the ligand L is a bidentate ligand of formula (V), as reported above, and the metal M is Ni or Pd; the presence of the specific cocatalyst (B), according to the invention, allows to obtain branched polyethylenes, having higher number of total branches and lower melting point values in comparison with polyethylenes produced with the same catalysts, but using MAO as cocatalyst.

The (co)polymerization process according to the present invention can be carried out in the liquid phase or in gas phase; in the former case, it is advantageously carried out in the presence of an inert hydrocarbon solvent, either aromatic (preferably toluene) or aliphatic (preferably propane, hexane, heptane, isobutane, isopentane, cyclohexane or isooctane; more preferably isopentane or isooctane).

Alternatively, the (co)polymerization process may be carried out in an olefin solvent. and particularly in a mixture of linear α-olefins and/or higher branched or internal olefins.

The starting olefinic monomer can be supplied to the reactor together with an inert diluent, such as nitrogen or helium, when the reactant is gaseous, or in a liquid solvent when the reactant is in the liquid form.

The (co)polymerization temperature is preferably comprised between −20° C. and 150° C. more preferably between 10° C. and 100° C., and even more preferably between 40 and 90° C. The (co)polymerization pressure is preferably comprised between 100 and 10,000 kPa, more preferably between 200 and 8,000 kPa, and even more preferably between 500 and 2,000 kPa.

Reaction times of from 10 minutes to 2 hours have been found to be suitable, depending on the activity of the catalyst system and on the reaction conditions. At the end of the polymerization reaction, a conventional catalyst deactivating agent, such as water, methanol, or another alcohol, may be added to the reaction mixture, in order to terminate the reaction.

The reaction can be terminated also by introducing air.

The following experimental examples are reported for illustrative and non limiting purposes.

GENERAL PROCEDURES AND CHARACTERIZATIONS

All the operations with the catalyst systems and the catalyst components (A) and (B) were carried out under nitrogen atmosphere.

Polymerization Solvents

Isooctane (2,4,4-trimethylpentane, 99.8% purity) was dried by prolonged nitrogen purge, followed by passage over molecular sieves (water content of about 1 ppm).

Anhydrous toluene (99.8% purity) from Aldrich was dried over 4 Å molecular sieves (water content of about 3 ppm).

Ethylene (99.5% purity) was purified over a column containing 4 Å molecular sieves and BTS catalyst (purchased from BASF) in order to reduce water and oxygen content to <1 ppm.

Intrinsic Viscosity (I.V.): the intrinsic viscosity of the polymers was measured at 135° C. in decaline (data reported in Table 1) or in tetrahydronapthalene (THN) (data reported in Table 3).

GPC Analysis: High temperature GPC analyses were performed using the following chromatographic conditions:

| Column: | PLgel 2 × mixed bed-B, 30 cm, 10 microns |
|---|---|
| Solvent: | 1,2-dichlorobenzene with antioxidant |
| Flow rate: | 1.0 ml/min |
| Temperature: | 140° C. |
| Detector: | refractive index |
| Calibration: | polystyrene |

DSC Analysis: DSC analyses were performed on a Perkin Elmer DSC7. The following temperature program was used:

| Temp 1: −40° C. | Time 1: 3.0 min | Rate 1: 15.0° C./min |
|---|---|---|
| Temp 2: 200° C. | Time 2: 3.0 min | Rate 2: 15.0° C./min |
| Temp 3: −40° C. | Time 3: 3.0 min | Rate 3: 15.0° C./min |
| Temp 4: 200° C. | Time 4: 3.0 min | Rate 4: 15.0° C./min |
| Temp 5: −40° C. | | |

The Tm and ΔH values reported in Tables 1 and 2 refer to the second melting point Tm2.

Degree of Branching: the total number of branches per 1000 carbon atoms was determined by $^{13}C$ NMR spectroscopy, using $1,2-C_2D_2Cl_4$ as solvent, according to the method described in *J. Am. Chem. Soc.* 120:4049–4050, 1998.

CATALYST COMPONENTS

Component (A):

The catalyst [(2,6-iPr$_2$Ph)—N=C(Me)—C(Me)=N—(2,6-iPr$_2$Ph)]NiBr$_2$, corresponding to formula (V), was prepared as described in Example 29 of WO 96/23010.

The catalyst [(2,6-iPr$_2$Ph)—N=C(An)—C(An)=N—(2,6-iPr$_2$Ph)]NiBr$_2$ (An=acenapthenquinone) corresponding to formula (V), was prepared as described in Example 31 of WO 96/23010.

The catalyst {2,6-[(2,6-iPr$_2$Ph)—N=C(Me)]pyridyl}FeCl$_2$, corresponding to formula (VI), was prepared as described in Examples 8 of WO 98/27124.

The catalysts {2,6-[(2,4,6-Me$_3$Ph)—N=C(Me)]pyridyl}FeCl$_2$, corresponding to formula (VI), was prepared according to the procedure reported in Example 11 of WO 98/27124, using FeCl$_2$ instead of CoCl$_2$.

Component (B):

Tris(2,4,4-trimethyl-pentyl)aluminum (TIOA)

Tris(2,4,4-trimethyl-pentyl)aluminum was prepared according to the method described in Liebigs Ann. Chem., Volume 629, Ziegler et al. "Aluminiumtrialkyle und Dialkylaluminiumhydride aus Aluminiumisobutyl-Verbindungen [Aluminum trialkyls and dialkylaluminium hydrides from aluminum isobutyl compounds]", pages 14–19.

(2,4,4-Trimethyl-pentyl)aluminoxane (TIOAO)

(2,4,4-trimethyl-pentyl)aluminoxane used in Examples 1, 3–5, 13–14 and 20, and Comp. Ex. 3 was prepared immediately prior to use by reacting a 0.45 M toluene solution of tris(2,4,4-trimethyl-pentyl)aluminum (TIOA, prepared as described above) with about a half-equivalent of water. More specifically, 3.29 g of TIOA (9.00 mmol) were dissolved in 20 g of toluene in a bottle with a septum cap. The solution was cooled to 0–4° C. using an ice bath, and 81 ml of water (4.5 mmol) added in four shots using a 25 ml syringe, whilst maintaining the temperature below 15° C. and purging the solution with nitrogen. The resulting solution (9.0 mmol TIOAO) was ready to be introduced into the reactor. The cocatalysts used in Examples 6, 7 and 8 were prepared following the above procedure, by using a molar ratio of water/TIOA of 0.65:1, 0.70:1 and 0.75:1 respectively.

Tris(2,3,3-trimethyl-butyl)aluminum (TTMBA)

Tris(2,3,3-trimethyl-butyl)aluminum was prepared as described in WO 99/21899 (international patent application PCT/EP98/06732).

(2,3,3-trimethyl-butyl)aluminoxane (TTMBAO)

(2,3,3-trimethyl-butyl)aluminoxane (TTMBAO) was prepared immediately prior to use from the reaction of a 0.45 M toluene solution of tris(2,3,3-trimethyl-butyl)aluminum (TTMBA), prepared as reported above, with about a half-equivalent of water whilst maintaining the reaction temperature in the range 5–15° C.

(2-Methyl-propyl)aluminoxane (TIBAO)

TIBAO was prepared immediately prior to use by reacting a 0.45 M toluene solution of TIBA (obtained from Aldrich; catalogue n. 25, 720–6, 1996–7) with a half-equivalent of water, whilst maintaining the reaction temperature in the range 5–15° C.

Methylalumoxane (MAO)

Methylalumoxane was obtained from Witco as a solution in toluene (4.99% w/w Al).

Tris(2-phenyl-propyl)aluminium—Al(CH$_2$CHMePh)$_3$ (TPPA)

In a glove box, α-methyl-styrene (283 g, 2.3 mol; Aldrich, dried over sieves) was dissolved in dry toluene (ca. 300 ml) in a 1 L 3-neck flask. Al{CH$_2$CHMe$_2$}$_3$ (TIBA, 100 ml, 0.395 mmol, ex-Witco) was added over 10 min by syringe to the rapidly stirred solution at ambient temperature. The reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 90 minutes to an internal temperature of 110.7° C. The reaction was allowed to reflux for 16 hours (final reflux temperature 126.4° C.), affording ca. 100% of the theoretical maximum yield of isobutene (ca.

3.0 equivalents/Al). The remaining olefin and solvent were removed in vacuo (50° C., 0.05 mbar, 90 min) utilizing a dry ice/acetone bath to give 162 g of tris(2-phenyl-propyl) aluminium.

Tris(2-phenyl-propyl)aluminoxane (TPPAO)

Tris(2-phenyl-propyl)aluminoxane (TPPAO) was prepared immediately prior to use from the reaction of a 0.45 M toluene solution of tris(2-phenyl-propyl)aluminium (TPPA) prepared as reported above, with a half-equivalent of water whilst maintaining the reaction temperature in the range 5–15° C. The cocatalysts used in Example 10 was prepared following the above procedure, by using a molar ratio of water/TPPA of 0.75:1.

Tris [2-(4-fluoro-phenyl)-propyl]aluminium—Al [$CH_2CHMe(4-F—C_6H_4)$]$_3$(TFPPA)

In the glove box, 2-(4-fluoro-phenyl)-propylene (65.1 g, 0.48 mol; Acros, dried over sieves) was dissolved in dry toluene (ca. 70 ml) in a 250 ml 3-neck flask. Al{$CH_2CHMe_2$}$_3$ (TIBA, 27.9 ml, 0.120 mol, ex-Witco) was added over 10 min by syringe to the rapidly stirred solution. The reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 90 minutes to an internal temperature of 119.6° C. The reaction was allowed to reflux for 16 hours (final reflux temperature 123.5° C.), affording ca. 100% of the theoretical maximum yield of isobutene. The remaining olefin and solvent were removed in vacuo (60° C., 0.05 mbar, 90 min) utilizing a dry ice/acetone bath to give 50 g of tris[2-(4-fluoro-phenyl)-propyl]aluminium.

Tris[2-(4-fluoro-phenyl)-propyl]aluminoxane (TFPPAO)

Tris[2-(4-fluoro-phenyl)-propyl]aluminoxane (TFPPAO) was prepared immediately prior to use from the reaction of a 0.45 M toluene solution of tris[2-(4-fluoro-phenyl)propyl] aluminium (TFPPA) prepared as reported above, with a half-equivalent of water whilst maintaining the reaction temperature in the range 5–15° C. The cocatalysts used in Example 12 was prepared following the above procedure, by using a molar ratio of water/TFPPA of 0.75:1.

Tris[2-(4-chloro-phenyl)-propyl]aluminium—Al [$CH_2CHMe(4-Cl—C_6H_4)$]$_3$(TCPPA)

In the glove box, 2-(4-chloro-phenyl)-propylene (73.2 g, 0.48 mol; Acros, dried over sieves) was dissolved in dry toluene (ca. 80 ml) in a 250 ml 3-neck flask. Al{$CH_2CHMe_2$}$_3$ (TIBA, 30.0 ml, 0.128 mol, ex-Witco) was added over 10 min by syringe to the rapidly stirred solution. The reaction flask was removed from the glove box and a reflux condenser and nitrogen line attached in the fume hood. The isobutene product was collected using a graduated collection vessel immersed in a −78° C. acetone/dry ice bath. The reaction mixture was warmed over 90 minutes to an internal temperature of 123.4° C. The reaction was allowed to reflux for 18 hours (final reflux temperature 124.4° C.), affording ca. 100% of the theoretical maximum yield of isobutene. The remaining olefin and solvent were removed in vacuo (60° C., 0.05 mbar, 90 min) utilizing a dry ice/acetone bath to give 69 g of tris[2-(4-chloro-phenyl)-propyl]aluminium.

Tris[2-(4-chloro-phenyl)-propyl]aluminoxane (TCPPAO)

Tris[2-(4-chloro-phenyl)-propyl]aluminoxane (TCPPAO) was prepared immediately prior to use from the reaction of a 0.45 M toluene solution of tris[2-(4-chloro-phenyl)propyl] aluminium (TCPPA) prepared as reported above, with a half-equivalent of water whilst maintaining the reaction temperature in the range 5–15° C. The cocatalysts used in Example 16 was prepared following the above procedure, by using a molar ratio of water/TCPPA of 0.75:1.

Tris(2-ethyl-3-methyl-butyl)aluminium (TEMBA)

Tris(2-ethyl-3-methyl-butyl)aluminium was prepared as described in WO 99/21899 (international patent application PCT/EP98/06732).

Tris(2-ethyl-3-methyl-butyl)aluminoxane (TEMBAO)

Tris(2-ethyl-3-methyl-butyl)aluminoxane (TEMBAO) was prepared immediately prior to use from the reaction of a 0.45 M toluene solution of Tris(2-ethyl-3-methyl-butyl) aluminium (TEMBA) prepared as reported above, with about a half-equivalent of water whilst maintaining the reaction temperature in the range 5–15° C.

CATALYST SYSTEM PREPARATION

Catalyst systems preparation was generally carried out by premixing the catalyst (component (A)) and the cocatalyst (component (B)) in 15 ml toluene at room temperature and maintaining the mixture under stirring for a maximum of 2 hours. The obtained solution was then used immediately in the polymerization reaction. In some cases, the solution of the catalyst component (A) was injected directly into the reactor containing the cocatalyst.

POLYMERIZATION TRIALS

EXAMPLES 1–2 AND COMPARATIVE EXAMPLES 1–3

A 5 liter reactor equipped with turbine stirrer, steam/water temperature control and a catalyst injection system was heated to 150–160° C. overnight. whilst purging with nitrogen. cooled and then pickled at 70° C. using a mixture of TIBA (0.25 g), toluene (20 mL) and propylene (500 g). The pickle mixture was removed and the reactor was purged with nitrogen several times. The reactor was then charged with 2.5 L isooctane whilst increasing the temperature from 20 to 50° C. and adding ethylene to a total pressure of 7.5 bar. The total pressure was kept constant throughout the polymerization by feeding ethylene.

A cocatalytic solution prepared as described above, containing 9.0 mmol TIOAO, was introduced into the reactor using an injection system, washed in using 20 g of toluene.

Meanwhile {2,6-[(2,4,6-Me$_3$Ph)—N=C(Me)] pyridyl}FeCl$_2$ (22.9 μmol) was mixed with 22.88 g of a toluene solution containing 3.294 g TIOAO (9.0 mmol). Ten minutes after the introduction of the 9.0 mmol of TIOAO into the reactor, 4.995 g (5.00 μmol) of the solution of the activated iron compound (aged for 1 h; having the Al/Fe premix ratio reported in Table 1) was injected into the reactor (using 20 mL toluene), containing the Al/Fe ratio reported in Table 1. The polymerization was continued for 1 hour at a constant temperature of 50° C., using 840–1100 rpm stirring.

The polymerization was then stopped by injection of 5–10 mL methanol. The heating was then discontinued and the ethylene rapidly vented and the slurry polyethylene was precipitated with methanol and collected. The polyethylene fractions were dried (70–80° C., 200 mbar, nitrogen purge) and combined to give the total yield of polyethylene.

The reaction conditions as well as polymerization yields and characterization data of the obtained polymers are indicated in Table 1.

In Example 2, ethylene polymerization was performed according to a similar procedure with TTMBAO as cocatalyst. In Comparative Examples 1 and 2 ethylene polymerization was performed according to a similar procedure with MAO and TIBAO, respectively, as cocatalysts. In Comparative Examples 3 ethylene polymerization was performed according to a similar procedure, using TIOA in the premixing step and TIOAO in the autoclave.

For these experiments, the reaction conditions, as well as polymerization yields and I.V. of the obtained polymers, are indicated in Table 1.

The obtained data demonstrate that the catalyst systems according to the present invention are able to give polymerization activities comparable or even superior to the ones obtained with other cocatalysts known in the state of the art. For instance, the use of the prior art cocatalyst TIBAO in Comparative Example 2 showed a significantly lower activity compared to Examples 1 and 2, wherein components (B) were used, according to the present invention.

Figure 2:
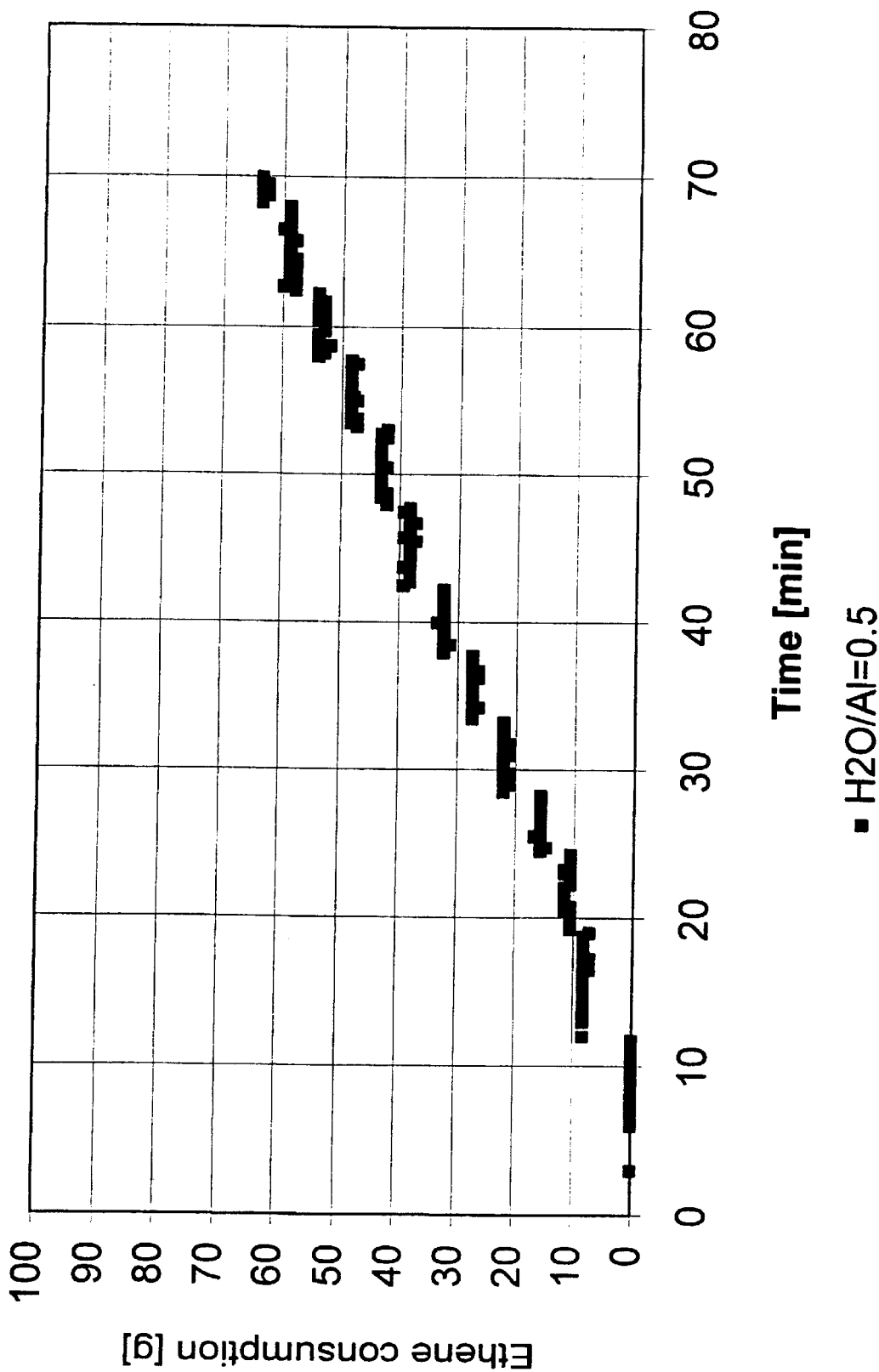
Figure 3:
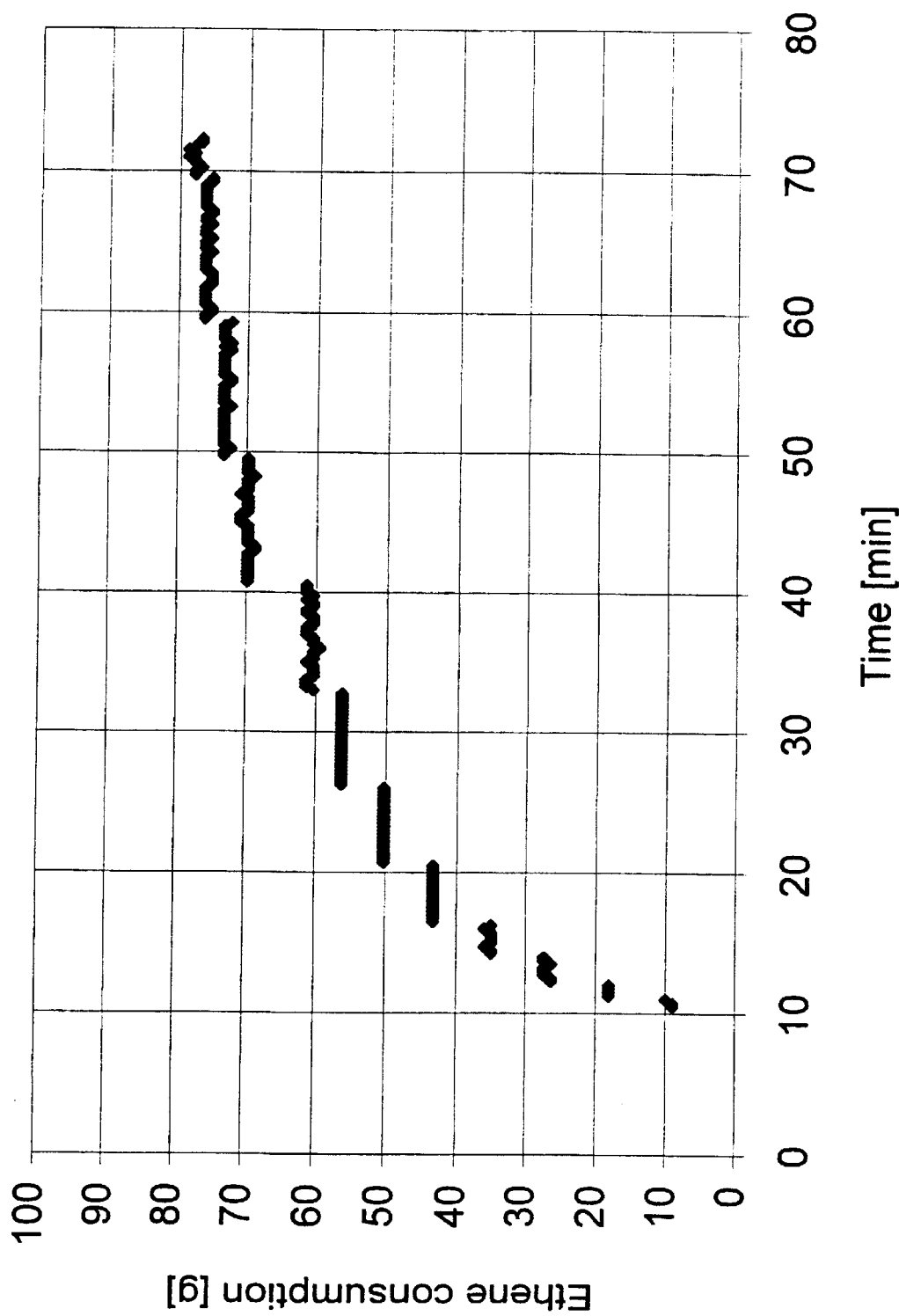
FIG. 3 shows a graph wherein the polymerization activity of a prior art catalyst system is plotted vs. polymerization time.

FIGS. 1 to 3 report the kinetic profiles of the polymerization reactions carried our in Example 1, Example 2 and Comparative Example 1 respectively, wherein the catalyst polymerization activity (measured as monomer consumption) is plotted as a function of time (polymerizations start at time=10 minutes); the plots were obtained by determining the quantity (g) of ethylene consumption at time intervals of 15 seconds.

FIG. 3 shows that, when MAO is used as cocatalyst, a pronounced catalyst deactivation occurs during the initial phase of the polymerization, as is evident from the ethylene consumption pattern; initial ethylene consumption is very rapid, whereas after approximately 15 minutes polymerization proceeds at a much slower rate. Therefore, when MAO is used, although the initial activity is high, a significant catalyst deactivation takes place after 10–15 minutes of polymerization.

In contrast, the presence of one or more components (B) according to the present invention totally inhibits the catalyst deactivation; in FIGS. 1 and 2 no significant catalyst decay is observed after more than 1 hour, as evident from the fact that ethylene consumption does not change with time.

Finally, Comparative Example 3 demonstrates that, contrarily to the teaching of the prior art, the use of an aluminum alkyl as premixing agent, such as TIOA, leads to the complete deactivation of the catalyst system. Unexpectedly, this does not happen by using the alumoxane of TIOA, as demonstrated in example 1.

EXAMPLES 3 AND 4

Ethylene was polymerized according to the procedure of Example 1, with the only difference that two different cocatalysts were used in the preparation of the catalyst system and in the polymerization reaction, respectively. Reaction conditions, polymerization yields and the I.V. of the obtained polymers are reported in Table 1.

EXAMPLES 5–12 AND COMPARATIVE EXAMPLE 4

In Example 5, a 2.35 liter reactor equipped with an anchor stirrer, steam/water temperature control and a catalyst injection system was heated to 150–160° C. overnight, whilst purging with nitrogen, cooled and then pickled at 70° C. using a mixture of TIBA (0.25 g), toluene (20 mL) and isooctane (500 g). The pickle mixture was removed and the reactor was purged with nitrogen several times. The reactor was then charged with 1.25 L isooctane, whilst increasing the temperature from 20 to 50° C. and adding ethylene to a total pressure of 7.5 bar. The total pressure was kept constant throughout the polymerization by feeding ethylene.

A cocatalytic solution prepared as described above, containing 2.0 mmol TIOAO (prepared, as described above. using a 0.5:1 molar ratio of water and TIOA), was introduced into the reactor using an injection system, washed in using 20 g of toluene.

Meanwhile $\{2,6\text{-}[(2,4,6\text{-}Me_3Ph)\text{—}N\text{=}C(Me)]$ pyridyl$\}FeCl_2$ (16.0 $\mu$mol) was mixed with 15.60 g of a toluene solution containing 2.23 g TIOAO (6.1 mmol). Ten minutes after the introduction of the 2.0 mmol of TIOAO into the reactor, 0.985 g (1.00 $\mu$mol) of the solution of the activated iron compound (aged for 15 min; having the Al/Fe premix ratio reported in Table 1) was injected into the reactor (using 20 mL toluene), containing the Al/Fe ratio reported in Table 1. The polymerization was continued for 1 hour at a constant temperature of 50° C., using 840–1100 rpm stirring.

The polymerization was then stopped by injection of 5–10 mL methanol. The heating was then discontinued and the ethylene rapidly vented and the slurry polyethylene was precipitated with methanol and collected. The polyethylene fractions were dried (70–80° C., 200 mbar, nitrogen purge) and combined to give the total yield of polyethylene.

The reaction conditions, polymerization yields and characterization data of the obtained polymers are indicated in Table 1.

In Example 6–8, ethylene polymerization was performed according to the procedure of Example 5, but TIOAO was prepared using the ratios of water to TIOA given in Table 1.

In Examples 9 and 10, ethylene polymerization was performed according to the procedure of Example 5, using TPPAO instead of TIOAO, with the water/TPPA ratio given in Table 1; the amounts of the catalysts components used are reported in Table 1.

In Examples 11 and 12, ethylene polymerization was performed according to the procedure of Example 5, using TFPPAO instead of TIOAO, with the water/TFPPA ratio given in Table 1; the amounts of the catalyst components used are reported in Table 1.

In Comparative Example 4, ethylene polymerization was performed according to the procedure to Example 5, using MAO instead of TIOAO as cocatalyst, and using the amounts of catalyst components reported in Table 1.

For these experiments, the reaction conditions, polymerization yields and characterization data of the obtained polymers are indicated in Table 1.

EXAMPLE 13 AND COMPARATIVE EXAMPLE 5

Ethylene was polymerized according to the procedure of Example 1, with the difference that [(2,6-iPr$_2$Ph)—N=C(Me)—C(Me)=N—(2,6-iPr$_2$Ph)]NiBr$_2$ was used as the catalyst; moreover, in Comparative Example 5, MAO was used as cocatalyst instead of TIOAO.

Reaction conditions and polymerization yields of the obtained polymers are reported in Table 2.

The obtained results demonstrate that the catalyst systems according to the invention show polymerization activities comparable to the ones obtained when MAO is used as cocatalyst.

EXAMPLE 14

In Example 14, ethylene polymerization was performed according to the procedure of Example 13, but using [(2,6-iPr$_2$Ph)—N=C(An)—C(An)=N—(2,6-iPr$_2$Ph)]NiBr$_2$ (An=acenapthenquinone) as catalyst and TIOAO as cocatalyst. Reaction conditions, polymerization yields and characterization data of the obtained polymers are reported in Table 2.

EXAMPLES 15–19 AND COMPARATIVE EXAMPLE 6

In the following examples, no catalyst premixing step was carried out in the polymerization procedure.

In Example 15, a 5 liter reactor was pickled and then charged with 2.5 L isooctane, as described in Example 1, and ethylene was added to a total pressure of 7.8 bar. A cocatalytic solution, prepared as described above, containing 3.0 mmol TCPPAO, was introduced into the reactor using an injection system, washed in using 20 g of toluene. Meanwhile $[(2,6\text{-}iPr_2Ph)\text{—}N\!\!=\!\!C(An)\text{—}C(An)\!\!=\!\!N\text{—}(2,6\text{-}iPr_2Ph)]NiBr_2$ (An=acenapthenquinone) (22.9 $\mu$mol) was dissolved in 10.03 g of toluene. Ten minutes after the introduction of the TCPPAO into the reactor, 2.579 g (5.00 $\mu$mol) of the solution of the iron compound were injected into the reactor (using 20 mL toluene), resulting in the Al/Fe ratio reported in Table 2. The polymerization was continued for 1 hour at a constant temperature of 50° C, using 840–1100 rpm stirring.

The polymerization was then stopped by injection of 5–10 mL methanol. The heating was then discontinued and the ethylene rapidly vented and the polyethylene product isolated by solvent removal. The polymer was dried (70–80° C., 200 mbar, nitrogen purge) and combined to give the total yield of polyethylene.

The reaction conditions as well as polymerization yields and polymer characterization data are indicated in Table 2.

In Example 16, ethylene polymerization was performed according to the procedure of Example 15, wherein TCPPAO was prepared with the water/TCPPA ratio given in Table 2.

In Example 17, ethylene polymerization was performed according to the procedure of Example 15, using TFPPAO as cocatalyst instead of TCPPAO.

In Example 18, ethylene polymerization was performed according to the procedure of Example 15, using TTMBAO as cocatalyst instead of TCPPAO.

In Example 19, ethylene polymerization was performed according to the procedure of Example 15, using TEMBAO as cocatalyst instead of TCPPAO.

In Comparative Example 6, ethylene polymerization was performed according to the procedure of Example 15, using MAO as cocatalysts.

For these experiments, the reaction conditions, as well as polymerization yields and characterization data of the obtained polymers are indicated in Table 2.

Figure 4:
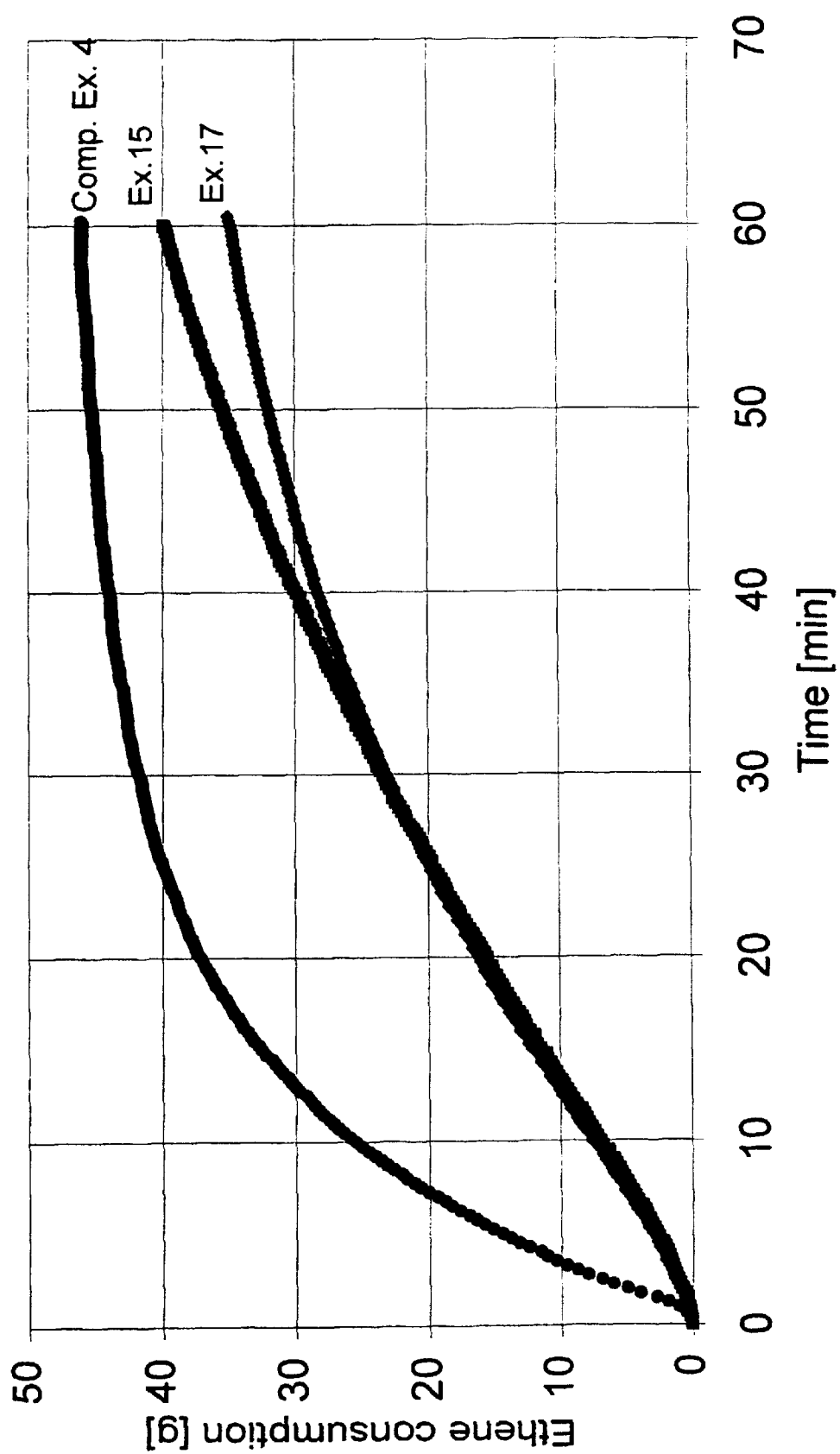
FIG. 4 shows a graph wherein is plotted the polymerization activity of catalyst systems according to the present invention vs. polymerization time, compared to that of a prior art catalyst system.

FIG. 4 reports the kinetic profiles of the polymerization reactions carried our in Examples 15 and 17 and Comparative Example 6 respectively, wherein the catalyst polymerization activity (measured as monomer consumption) is plotted as a function of time (polymerizations start at time=0 minutes); the plots were obtained by determining the quantity (g) of ethylene consumed at time intervals of 15 seconds.

FIG. 4 shows that, when MAO is used as cocatalyst (Comp. Ex. 6), a pronounced catalyst deactivation occurs during the initial phase of the polymerization, as is evident from the ethylene consumption pattern; initial ethylene consumption is very rapid, whereas after approximately 15 minutes polymerization proceeds at a much slower rate. Therefore, when MAO is used, although the initial activity is high, a significant catalyst deactivation takes place after 10–15 minutes of polymerization. In contrast, the presence of one or more components (B) according to the present invention inhibits the catalyst deactivation; in FIG. 4 very little catalyst decay is observed after more than 1 hour for Ex. 15 and 17.

Moreover, from the data reported in Table 2, it is evident that the catalyst systems of the present invention allow to obtain polyethylenes having a higher number of total branches with respect to polymers that are obtainable with catalyst systems containing conventional cocatalysts, such as MAO; in fact, in Examples 15–19, catalyst systems containing components (B) of the invention afford polyethylenes having a number of total branches equal to 67–71 brances/1000 carbon atoms, i.e. much higher than 57.5 branches/1000C, obtained using MAO as cocatalyst (see Comp. Ex. 6).

In line with the above branching tendency, the polyethylenes obtained by means of the catalyst systems of the invention show melting points values much lower than the one of Comp. Ex. 6.

EXAMPLE 20 AND COMPARATIVE EXAMPLES 7–8

A 200 mL glass autoclave, provided with magnetic stirrer, temperature indicator and feeding line for ethylene, was purified and fluxed with ethylene at 35° C. At room temperature were introduced 90 ml of hexane.

The catalytic system was prepared separately in 10 ml of hexane by consecutively introducing TIOAO (Al/H$_2$O=2.1), TIOA or MAO and, after 5 minutes under stirring, the amount of $\{2,6\text{-}[(2,6\text{-}iPr_2Ph)\text{—}N\!\!=\!\!C(Me)]pyridyl\}FeCl_2$ reported in Table 3, dissolved in the lowest possible amount of toluene.

After 5 minutes under stirring, the solution was introduced into the autoclave under ethylene flow; the reactor was closed and the temperature risen to 50° C. The autoclave was then pressurized to 4.6 barg and the total pressure was kept constant by feeding ethylene.

After 10 minutes, the reaction was stopped by cooling and degassing the reactor, and by introducing 1 ml MeOH. The obtained polymer was washed with acidic MeOH, the with MeOH and finally dried under vacuum in oven at 60° C.

The polymerization conditions, the obtained yields and IV data are indicated in Table 3.

From the results reported in Table 3, it is evident that the catalyst systems according to the present invention are unexpectedly as active as the ones known in the state of the art, using MAO as cocatalyst. Unexpectedly, the use of an aluminum alkyl such as TIOA is completely inactive in olefin polymerization, as demonstrated in Comparative Example 8.

TABLE 1

| Example | Catalyst micromol | Cocatalyst premix | Al/M premix mol/mol | Cocatalyst Reactor | Al/M reactor mol/mol | H₂O/Al mol/mol | Time min | Yield g$_{PE}$ | Activity Kg$_{PE}$/g$_M$·h | I.V. dl/g | $M_w \times 10^{-3}$ | $M_w/M_n$ | Tm °C. | ΔH J/g |
|---|---|---|---|---|---|---|---|---|---|---|---|---|---|---|
| Ex. 1 | 5.0 | TIOAO | 393 | TIOAO | 1800 | 0.50 | 60 | 66.0 | 236 | 1.37 | 91.7 | 9.00 | n.d. | n.d. |
| Ex. 2 | 5.0 | TTMBAO | 366 | TTMBAO | 1800 | 0.50 | 65 | 82.7 | 273 | 1.71 | 226.0 | 13.1 | n.d. | n.d. |
| Comp. Ex. 1 | 0.2 | MAO | 380 | MAO | 1800 | 0.50 | 60 | 60.8 | 5443 | 2.05 | n.d. | n.d. | n.d. | n.d. |
| Comp. Ex. 2 | 22.9 | TIBAO | 393 | TIBAO | 393 | 0.50 | 65 | 33.4 | 24 | 3.7 | n.d. | n.d. | n.d. | n.d. |
| Comp. Ex. 3 | 22.9 | TIOA | 1500 | TIOAO | 393 | 0.50 | 60 | 0.0 | 0 | | | | | |
| Ex. 3 | 0.2 | MAO | 380 | TIOAO | 1800 | 0.50 | 51 | 23.7 | 2500 | 2.33 | n.d. | n.d. | n.d. | n.d. |
| Ex. 4 | 5.0 | TIOAO | 440 | MAO | 1800 | | 65 | 31.7 | 100 | 2.84 | n.d. | n.d. | n.d. | n.d. |
| Ex. 5 | 1.0 | TIOAO | 380 | TIOAO | 2000 | 0.50 | 60 | 53.0 | 949 | n.d. | 88.0 | 7.9 | n.d. | n.d. |
| Ex. 6 | 0.2 | TIOAO | 380 | TIOAO | 10000 | 0.65 | 60 | 11.0 | 985 | n.d. | 38.5 | 3.7 | 132.5 | 229.7 |
| Ex. 7 | 0.2 | TIOAO | 380 | TIOAO | 10000 | 0.70 | 60 | 41.0 | 3671 | n.d. | 51.9 | 4.7 | 134.5 | 234.5 |
| Ex. 8 | 0.2 | TIOAO | 380 | TIOAO | 10000 | 0.75 | 60 | 88.0 | 7878 | n.d. | 183.0 | 13.2 | 134.0 | 231.0 |
| Ex. 9 | 5.0 | TPPAO | 380 | TPPAO | 400 | 0.50 | 60 | 51.9 | 186 | n.d. | 84.7 | 12.1 | 135.0 | 230.6 |
| Ex. 10 | 0.6 | TPPAO | 380 | TPPAO | 3330 | 0.75 | 60 | 64.0 | 1910 | n.d. | n.d. | n.d. | n.d. | n.d. |
| Ex. 11 | 0.4 | TFPPAO | 380 | TFPPAO | 5000 | 0.50 | 60 | 33.0 | 1477 | n.d. | n.d. | n.d. | 133.9 | 233.7 |
| Ex. 12 | 0.3 | TFPPAO | 380 | TFPPAO | 6667 | 0.75 | 60 | 50.5 | 3014 | n.d. | n.d. | n.d. | n.d. | n.d. |
| Comp. Ex. 4 | 0.1 | MAO | 380 | MAO | 20000 | | 67 | 62.5 | 10022 | n.d. | 243.5 | 16.0 | 139.0 | 231.0 |

TABLE 2

| Example | Catalyst micromol | Cocatalyst premix | Al/M premix mol/mol | Cocatalyst Reactor | Al/M reactor mol/mol | H₂O/Al mol/mol | Time min | Yield g$_{PE}$ | Activity Kg$_{PE}$/g$_M$·h | ΔH J/g | $M_w \times 10^{-3}$ | $M_w/M_n$ | Branches/1000 C | Tm °C. |
|---|---|---|---|---|---|---|---|---|---|---|---|---|---|---|
| Ex. 13 | (1) 14.3 | TIOAO | 353 | TIOAO | 632 | 0.50 | 55 | 29.9 | 39 | n.d. | n.d. | n.d. | n.d. | n.d. |
| Comp. Ex. 5 | (1) 14.2 | MAO | 1500 | MAO | 632 | | 50 | 28.9 | 42 | n.d. | n.d. | n.d. | n.d. | n.d. |
| Ex. 14 | (2) 5.0 | TIOAO | 380 | TIOAO | 1200 | 0.50 | 60 | 7.0 | 24 | 11.5 | 215.5 | 2.2 | n.d. | 43.9 |
| Ex. 15 | (2) 5.0 | — | — | TCPPAO | 600 | 0.50 | 60 | 39.9 | 136 | 35.2 | n.d. | n.d. | 70.3 | 39.5 |
| Ex. 16 | (2) 5.0 | — | — | TCPPAO | 600 | 0.75 | 60 | 35.8 | 122 | 33.8 | n.d. | n.d. | 67.0 | 42.4 |
| Ex. 17 | (2) 5.0 | — | — | TFPPAO | 600 | 0.50 | 60 | 35.0 | 119 | 31.4 | n.d. | n.d. | 71.0 | 38.6 |
| Ex. 18 | (2) 5.0 | — | — | TTMBAO | 600 | 0.50 | 60 | 14.0 | 48 | 35.8 | n.d. | n.d. | 67.3 | 42.5 |
| Ex. 19 | (2) 5.0 | — | — | TEMBAO | 600 | 0.50 | 60 | 18.0 | 61 | 36.9 | n.d. | n.d. | 68.4 | 42.5 |
| Comp. Ex. 6 | (2) 5.0 | — | — | MAO | 600 | | 60 | 46.8 | 159 | 45.6 | 289.5 | 2.3 | 57.5 | 57.3 |

(1) [(2,6-iPr2Ph)—N=C(Me)—C(Me)=N-(2,6-iPr2Ph)]NiBr2
(2) [(2,6-iPr2Ph)—N=C(An)—C(An)=N-(2,6-iPr2Ph)]NiBr2 (An = acenapthenequinone)

TABLE 3

| Example | Catalyst (micromol) | Cocatalyst | Cocatalyst (mmol) | Al/Fe (mol/mol) | Yield PE (g) | Activity (kgPE/g$_{Fe}$·h) | I.V. (dl/g) |
|---|---|---|---|---|---|---|---|
| Ex. 20 | 0.16 | TIOAO | 0.168 | 1020 | 1.39 | 933 | 1.59 |
| Comp. Ex. 7 | 0.16 | TIOA | 0.175 | 1065 | 0.00 | 0.00 | — |
| Comp. Ex. 8 | 0.20 | MAO | 0.216 | 1095 | 1.79 | 962 | 3.01 |

What is claimed is:

1. A catalyst system for the polymerization of olefins comprising the product obtained by contacting the following components:

(A) one or more late transition metal compounds having formula (I) or (II):

$$LMX_pX'_s \quad (I)$$

$$LMA \quad (II)$$

wherein M is a metal belonging to Group 8, 9, 10 or 11 of the Periodic Table of the Elements;

L is a bidentate or tridentate ligand of formula (III):

(III)

wherein:

B is a $C_1$–$C_{50}$ bridging group linking $E^1$ and $E^2$, optionally containing one or more atoms belonging to Groups 13–17 of the Periodic Table;

$E^1$ and $E^2$, the same or different from each other, are elements belonging to Group 15 or 16 of the Periodic Table and are bonded to said metal M;

the substituents $R^1$, the same or different from each other, are selected from the group consisting of hydrogen, linear or branched, saturated or unsaturated $C_1$–$C_{20}$ alkyl, $C_1$–$C_{20}$ alkyliden, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table; or two adjacent $R^1$ substituents form a saturated, unsaturated or aromatic $C_4$–$C_8$ ring, having from 4 to 20 carbon atoms;

m and n are independently 0, 1 or 2, so to satisfy the valence number of $E^1$ and $E^2$; q is the charge of the bidentate or tridentate ligand so that the oxidation state of $MX_pX'_s$ or MA is satisfied, the compound (I) or (II) being overall neutral;

the substituents X, the same or different from each other, are monoanionic sigma ligands selected from the group consisting of hydrogen, halogen, —R, —OR, —OSO$_2$CF$_3$, —OCOR, —SR, —NR$_2$ and —PR$_2$ groups, wherein the R substituents are linear or branched, saturated or unsaturated, $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radicals, optionally containing one or more atoms belonging to groups 13–17 of the Periodic Table; or two X groups form a metallacycle ring containing from 3 to 20 carbon atoms;

X' is a coordinating ligand selected from mono-olefins and neutral Lewis bases wherein the coordinating atom is N, P, O or S;

p is an integer ranging from 0 to 3; s ranges from 0 to 3;

A is a π-allyl or a π-benzyl group; and (B) the reaction product of water with one or more organometallic aluminum compounds of formula (IV):

$$Al(CH_2—CR^3R^4R^5)_xR^6_yH_z \qquad (IV)$$

wherein in any (CH$_2$—CR$^3$R$^4$R$^5$) groups, the same or different from each other, $R^3$ is a linear or branched, saturated or unsaturated $C_1$–$C_{20}$ alkyl, $C_3$–$C_{20}$ cycloalkyl or $C_7$–$C_{20}$ alkylaryl radical, optionally containing one or more Si or Ge atoms; $R^4$ is a saturated or unsaturated $C_3$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical, optionally containing one or more Si or Ge atoms, said radical being different from a straight alkyl or alkenyl group; or $R^3$ and $R^4$ form together a $C_4$–$C_6$ ring; $R^5$ is hydrogen or a linear or branched, saturated or unsaturated $C_1$–$C_{20}$ alkyl, $C_6$–$C_{20}$ aryl, $C_7$–$C_{20}$ alkylaryl or arylalkyl radical, optionally containing one or more Si or Ge atoms;

$R^6$ is a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radical;

x is an integer ranging from 1 to 3; z is 0 or 1; and y is 3–x–z, the molar ratio between said organometallic aluminum compound and water being comprised between 0.5:1 and 100:1.

2. The catalyst system according to claim 1, characterized in that, in the transition metal compound of formula (I) or (II), said metal M is selected from the group consisting of Fe, Co, Rh, Ni, Pd and Pt.

3. The catalyst system according to claim 1, characterized in that, in the ligand L of formula (III), said bridging group B corresponds to a structural formula selected from the group consisting of:

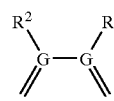
B-1

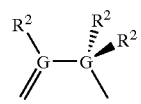
B-2

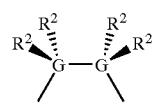
B-3

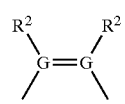
B-4

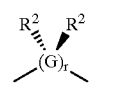
B-5

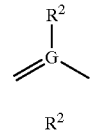
B-6

B-7

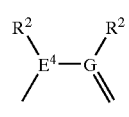
B-8

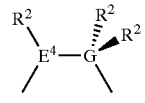
B-9

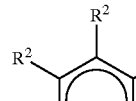
B-10

B-11

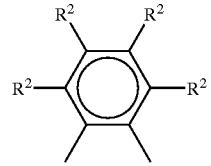
B-12

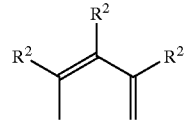
B-13

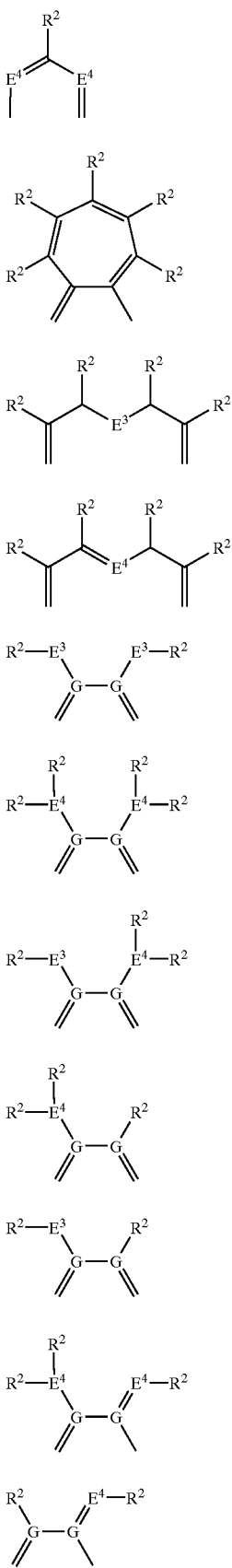

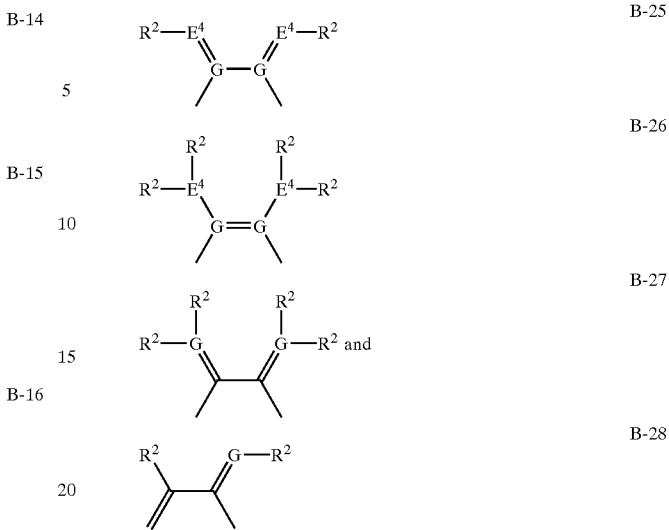

wherein G is an element belonging to Group 14 of the Periodic Table; r is an integer ranging from 1 to 5; $E^3$ is an element belonging to Group 16 and $E^4$ is an element belonging to Group 13 or 15 of the Periodic Table; the substituents $R^2$, the same or different from each other, are selected from the group consisting of hydrogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table; or two $R^2$ substituents form a saturated, unsaturated or aromatic $C_4$–$C_8$ ring, having from 4 to 20 carbon atoms, or they form a polycyclic ring system, optionally containing one or more Group 13–16 elements; a substituent $R^1$ and a substituent $R^2$ optionally form a substituted or unsubstituted, saturated, unsaturated or aromatic $C_4$–$C_8$ ring, having from 4 to 20 carbon atoms and optionally containing one or more Group 13–16 element.

4. The catalyst system according to claim 1, characterized in that, in the ligand L of formula (III), $E^1$ and $E^2$ are selected from the group consisting of N, P, O and S.

5. The catalyst system according to claim 1, characterized in that, in the ligand L of formula (III), the substituents $R^1$ are $C_6$–$C_{20}$ aryl groups, substituted in the 2 and 6 positions with a $C_1$–$C_{10}$ alkyl group.

6. The catalyst system according to claim 1, characterized in that, in the transition metal compound of formula (I), X is selected from the group consisting of hydrogen, methyl, phenyl, Cl, Br and I, and X' is selected from the group consisting of triphenylphosphine, tri($C_1$–$C_6$ alkyl) phosphines, tricycloalkyl phosphines, diphenyl alkyl phosphines, dialkyl phenyl phosphines, triphenoxyphosphine, trimethylphosphine, pyridine, substituted pyridines, di($C_1$–$C_3$ alkyl) ether and tetrahydrofurane.

7. The catalyst system according to claim 1, characterized in that, in the transition metal compound of formula (II), A is a π-allyl or a π-benzyl group selected from the group consisting of $CH_2CHCH_2$, $CH_2CHCHMe$, $CH_2CHCMe_2$, $CH_2Ph$ and $CH_2C_6F_5$ radicals.

8. The catalyst system according to claim 3, characterized in that:

in the ligand of formula (III), the bridging group B corresponds to structural formula B-1, wherein G is C, $E^1$ and $E^2$ are N, m and n are 1 and q is 0, said ligand having formula (V):

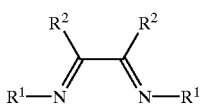

(V)

wherein the substituents $R^1$, the same or different from each other, are selected from the group consisting of hydrogen, linear or branched, saturated or unsaturated $C_1$–$C_{20}$ alkyl, $C_1$–$C_{20}$ alkyliden, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table; $R^2$ has the meaning reported in claim 3; and said metal M is Ni or Pd.

9. The catalyst system according to claim 8, characterized in that the substituents $R^1$ are $C_6$–$C_{20}$ aryl groups, optionally substituted in the 2 and 6 positions with a $C_1$–$C_{10}$ alkyl group; and the substituents $R^2$ are selected from the group consisting of hydrogen, methyl, ethyl, n-propyl, i-propyl and benzyl, or the substituents $R^2$ form together a mono or polycyclic ring system.

10. The catalyst system according to claim 3, characterized in that:
in the ligand of formula (III), B corresponds to the structure B-17 wherein the $E^4$ is N, $E^1$ and $E^2$ are N, m and n are 1, and q is 0, said ligand having formula (VI):

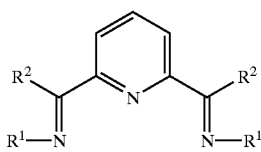

(VI)

wherein the substituents $R^1$, the same or different from each other, are selected from the group consisting of hydrogen, linear or branched, saturated or unsaturated $C_1$–$C_{20}$ alkyl, $C_1$–$C_{20}$ alkyliden, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table; $R^2$ has the meaning reported in claim 3; and
said metal M is selected from the group consisting of Fe, Ru, Co and Rh.

11. The catalyst system according to claim 10, characterized in that the substituents $R^1$ are $C_6$–$C_{20}$ aryl groups, optionally substituted in the 2 and 6 positions with a $C_1$–$C_{10}$ alkyl group; and the substituents $R^2$ are hydrogen or methyl.

12. The catalyst system according to claim 1, characterized in that, in component (B), the molar ratio between said organometallic aluminum compound and water ranges from 0.8:1 to 50:1.

13. The catalyst system according to claim 1, characterized in that, in formula (IV), $R^3$ is a $C_1$–$C_5$ alkyl group; $R^4$ is a branched-chain $C_3$–$C_{20}$ alkyl or alkylaryl group; $R^5$ is hydrogen or a $C_1$–$C_5$ alkyl group; and $R^6$ is a $C_1$–$C_5$ alkyl group.

14. The catalyst system according to claim 1, characterized in that, in component (B), said organometallic aluminum compound has formula (XV):

(XV)

wherein $R^3$, $R^5$, $R^6$, x, y and z have the meaning reported in claim 1; $R^7$ and $R^8$, the same or different from each other, are linear or branched, saturated or unsaturated $C_1$–$C_{20}$ alkyl, $C_3$–$C_{20}$ cycloalkyl, $C_6$–$C_{20}$ aryl, $C_7$–$C_{20}$ arylalkyl or alkylaryl groups; the substituents $R^3$ and $R^7$ or $R^7$ and $R^8$ optionally form one or two rings, having 3 to 6 carbon atoms; $R^9$ is hydrogen or has the same meaning of $R^7$ and $R^3$.

15. The catalyst system according to claim 14, characterized in that said organometallic aluminum compound is selected from the group consisting of tris(2,4,4-trimethylpentyl)aluminum bis(2,4,4-trimethylpentyl) aluminum hydride, isobutyl-bis(2,4,4-trimethylpentyl) aluminum, diisobutyl-(2,4,4-trimethylpentyl)aluminum, tris (2,4-dimethylheptyl)aluminum and bis(2,4-dimethylheptyl) aluminum hydride.

16. The catalyst system according to claim 1, characterized in that, in component (B), said organometallic aluminum compound has formula (XVI):

(XVI)

wherein $R^3$, $R^5$, $R^6$, x, y and z have the meaning reported in claim 1; $R^7$ and $R^8$, the same or different from each other, are linear or branched, saturated or unsaturated $C_1$–$C_{20}$ alkyl, $C_3$–$C_{20}$ cycloalkyl, $C_6$–$C_{20}$ aryl, $C_7$–$C_{20}$ arylalkyl or alkylaryl groups; the substituents $R^3$ and $R^7$ or $R^7$ and $R^8$ optionally form one or two rings, having 3 to 6 carbon atoms; $R^9$ is hydrogen or has the same meaning of $R^7$ and $R^8$.

17. The catalyst system according to claim 16, characterized in that said organometallic aluminum compound is selected from the group consisting of:
tris(2,3-dimethyl-butyl)aluminum, tris(2,3,3-trimethyl-butyl)aluminum, tris(2,3-dimethyl-pentyl)aluminum, tris(2,3-dimethyl-hexyl)aluminum, tris(2,3-dimethyl-heptyl)aluminum, tris(2-methyl-3-ethyl-pentyl) aluminum, tris(2-methyl-3-ethyl-hexyl)aluminum, tris (2-methyl-3-ethyl-heptyl)aluminum, tris(2-methyl-3-propyl-hexyl)aluminum, tris(2-ethyl-3-methyl-butyl) aluminum, tris(2-ethyl-3-methyl-pentyl)aluminum, tris (2,3-diethyl-pentyl)aluminum, tris(2-propyl-3-methyl-butyl)aluminum, tris(2-isopropyl-3-methyl-butyl) aluminum, tris(2-isobutyl-3-methyl-pentyl)aluminum, tris(2,3-trimethyl-pentyl)aluminum, tris(2,3,3-trimethyl-hexyl)aluminum, tris(2-ethyl-3,3-dimethyl-butyl)aluminum, tris(2-ethyl-3,3-dimethyl-pentyl) aluminum, tris(2-isopropyl-3,3-dimethylbutyl) aluminum, tris(2-trimethylsilyl-propyl)aluminum, tris (2-methyl-3-phenyl-butyl)aluminum, tris(2-ethyl-3-phenyl-butyl)aluminum, tris(2,3-dimethyl-3-phenyl-butyl)aluminum, tris(1-menthen-9-yl)aluminum
and the corresponding compounds wherein one of the hydrocarbyl groups is replaced by hydrogen and those wherein one or more of the hydrocarbyl groups are replaced by an isobutyl group.

18. The catalyst system according to claim 1, characterized in that, in component (B), said organometallic aluminum compound has formula (XVII):

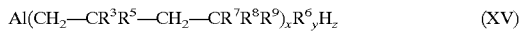

(XVII)

wherein $R^3$, $R^5$, x and z have the meaning reported in claim 1 and Ar is a substituted or unsubstituted aryl group having from 6 to 20 carbon atoms.

19. The catalyst system according to claim 18, characterized in that said organometallic aluminum compound is selected from the group consisting of:
tris(2-phenyl-propyl)aluminium tris[2-(4-fluoro-phenyl)-propyl]aluminium tris[2-(4-chloro-phenyl)-propyl] aluminium, tris[2-(3-isopropyl-phenyl)-propyl] aluminium tris(2-phenyl-butyl)aluminium tris(3- methyl-2-phenyl-butyl)aluminium tris(2-phenyl-pentyl)aluminium tris[2-(pentafluorophenyl)-propyl]aluminium tris[2,2-diphenyl-ethyl]aluminium tris[2-phenyl-2-methyl-propyl]aluminium
and the corresponding compounds wherein one of the hydrocarbyl groups is replaced by hydrogen.

20. A process for the homo-polymerization or co-polymerization of one or more olefinic monomers, wherein the polymerization reaction is performed in the presence of a catalyst system as claimed in claim 1.

21. The process according to claim 20, characterized in that said olefinic monomer is selected from the group consisting of ethylene, $C_3$–$C_{20}$ α-olefins, $C_4$–$C_{20}$ gem-substituted olefins, $C_8$–$C_{20}$ aromatic substituted α-olefins, $C_4$–$C_{20}$ cyclic olefins, $C_4$–$C_{20}$ non conjugated diolefins and $C_{20}$–$C_{1000}$ vinyl and vinylidene terminated macromers.

22. The process according to claim 21, characterized in that said α-olefin has formula $CH_2$=CHR, wherein R is hydrogen or a $C_1$–$C_{20}$ alkyl, $C_5$–$C_{20}$ cycloalkyl or $C_6$–$C_{20}$ aryl radical.

23. The process according to claim 20, characterized in that said olefinic monomer is a polar $C_4$–$C_{20}$ olefin, containing one or more functional groups selected from the group consisting of esters, ethers, carboxylates, nitrites, amines, amides, alcohols, halide and carboxylic acids.

\* \* \* \* \*

UNITED STATES PATENT AND TRADEMARK OFFICE
CERTIFICATE OF CORRECTION

PATENT NO. : 6,395,668 B1
DATED : May 28, 2002
INVENTOR(S) : Jan F. van Baar et al.

It is certified that error appears in the above-identified patent and that said Letters Patent is hereby corrected as shown below:

Column 34,
Line 4, change "$R^3$" to -- $R^8$ --
Line 8, after "aluminum" insert -- (TIOA), --
Line 41, change "tris(2,3-trimethy-pentyl)aluminum," to -- tris(2,3,3-trimethyl-pentyl) aluminum, --

Signed and Sealed this

Twenty-fifth Day of January, 2005

JON W. DUDAS
*Director of the United States Patent and Trademark Office*